US012800776B2

(12) United States Patent
Cao et al.

(10) Patent No.: US 12,800,776 B2
(45) Date of Patent: Nov. 17, 2026

(54) DEVICES, SYSTEMS, AND METHODS FOR TRITIUM GAS DETECTION

(71) Applicant: Ohio State Innovation Foundation, Columbus, OH (US)

(72) Inventors: Lei Raymond Cao, Columbus, OH (US); Anne Co, Columbus, OH (US); Praneeth Kandlakunta, Dublin, OH (US); Jason Hattrick-Simpers, Etobicoke (CA)

(73) Assignee: Ohio State Innovation Foundation, Columbus, OH (US)

( * ) Notice: Subject to any disclaimer, the term of this patent is extended or adjusted under 35 U.S.C. 154(b) by 83 days.

(21) Appl. No.: 19/101,725

(22) PCT Filed: Aug. 10, 2023

(86) PCT No.: PCT/US2023/029943

§ 371 (c)(1),
(2) Date: Feb. 6, 2025

(87) PCT Pub. No.: WO2024/035846

PCT Pub. Date: Feb. 15, 2024

(65) Prior Publication Data

US 2026/0056333 A1 Feb. 26, 2026

Related U.S. Application Data

(60) Provisional application No. 63/396,908, filed on Aug. 10, 2022.

(51) Int. Cl.
*G01T 1/185* (2006.01)

(52) U.S. Cl.
CPC .................................... *G01T 1/185* (2013.01)

(58) Field of Classification Search
None
See application file for complete search history.

(56) References Cited

U.S. PATENT DOCUMENTS 4,755,471 A 7/1988 Saito et al.
10,036,828 B2 7/2018 Jain
(Continued)

OTHER PUBLICATIONS

International Searching Authority (Isa/US). International Search Report and Written Opinion. PCT/US2023/029943. Issued on Nov. 20, 2023. 8 pages.
(Continued)

*Primary Examiner* — Hoon K Song
(74) *Attorney, Agent, or Firm* — Meunier Carlin & Curfman LLC

(57) ABSTRACT

Disclosed herein are devices, systems, and methods for tritium gas detection. For example, disclosed herein are proportional counter-gas ionization devices for tritium gas detection, the devices comprising a fluid cell comprising a wall defining a chamber, a cathode, an anode, and a hydrogen sorption layer. The hydrogen sorption layer comprises a metal that forms a metal hydride when hydrogen is absorbed and/or adsorbed. The hydrogen sorption layer coals the wall within the chamber. When the hydrogen sorption layer is heated after absorbing and/or adsorbing hydrogen, the metal hydride is configured to release the absorbed and/or adsorbed hydrogen into the chamber. When the cathode and the anode are conductively coupled to a voltage source, the voltage source is configured to apply a voltage to the cathode and the anode to thereby operate the device as a proportional counter-gas ionization device for tritium gas detection.

20 Claims, 9 Drawing Sheets

(56) References Cited

U.S. PATENT DOCUMENTS

| | | | | |
|---|---|---|---|---|
| 2009/0114828 | A1* | 5/2009 | Decker | G01T 1/178 250/362 |
| 2009/0255350 | A1 | 10/2009 | Decker | |
| 2014/0103221 | A1* | 4/2014 | Rottner | G01T 3/008 250/374 |
| 2018/0335414 | A1* | 11/2018 | Zhang | G01N 33/0062 |

OTHER PUBLICATIONS

Gedeonov et al. 1973. Sampling and determination of tritium in the lower layer of the atmosphere. International Agency for Atomic Energy Symposium on Environmental Control in the Vicinity of Nuclear Facilities. Paper No. 78. IAEA/SM-180/78. Warsaw. Nov. 5-9, 1973. 11 pages.

N. Akata et al. "Tritium concentrations in the atmospheric environment at Rokkasho, Japan before the final testing of the spent nuclear fuel reprocessing plant," Journal of Environmental Radioactivity, vol. 102, No. 9, pp. 837-842, 2011.

T. Aoyama et al. "Application of air proportional counters to a tritium-in-air monitor," Nuclear Instruments and Methods in Physics Research Section A, vol. 254, No. 3, pp. 620-626, 1987.

H. Ostlund, "A Sampling System for Atmospheric HT and HTO," IEEE Transactions on Nuclear Science, vol. 21, No. 1, pp. 510-512, 1974.

W. Plastino et al. "Tritium in water electrolytic enrichment and liquid scintillation counting," Radiation Measurements, vol. 42, pp. 68-73, 2007.

E. Furuta et al. "Measurement of tritium with high efficiency by using liquid scintillation counter with plastic scintillator," Applied Radiation and Isotopes, vol. 93, pp. 13-17, 2014.

K. Hofstetter et al. "Field deployable tritium analysis system for ground and surface water measurements," Journal of Radioanalytical and Nuclear Chemistry, vol. 233, No. 1-2, pp. 201-205, 1998.

P. Theodorsson, "A review of low-level tritium systems and sensitivity requirements," Applied Radiation and Isotopes, vol. 50, pp. 311-316, 1999.

D. Stanga and P. Cassette, "Improved method of measurement for tritiated water standardization by internal gas proportional counting," Applied Radiation and Isotopes, vol. 64, pp. 160-162, 2006.

W. W. Bowman and M. B. Hughes, "Proportional counting techniques for routine tritium analyses at environmental levels," in IAEA international symposium on methods of low-level counting and spectrometry, Berlin, F.R. Germany, 1981.

K. S. Shah et al. "High Efficiency Detection of Tritium Using Silicon Avalanche Photodiodes," IEEE Transactions on Nuclear Science, vol. 44, No. 3, pp. 774-776, 1997.

T. Uda et al. "Detection efficiency of plastic scintillator for gaseous tritium sampling and measurement system," Fusion Engineering and Design, vol. 85, pp. 1474-1478, 2010.

P. Jean-Baptiste et al. "3He mass spectrometry for very low-level measurement of organic tritium in environmental samples," Journal of Environmental Radioactivity, vol. 101, No. 2, pp. 185-190, 2010.

A. H. Love et al. "Improving tritium exposure reconstructions using accelerator mass spectrometry," Analytical and Bioanalytical Chemistry, vol. 379, pp. 198-203, 2004.

X. Hou and P. Roos, "Critical comparison of radiometric and mass spectrometric methods for the determination of radionuclides in environmental, biological and nuclear waste samples," Analytica Chimica Acta, vol. 608, pp. 105-139, 2008.

SENSEI Collaboration, "SENSEI: Direct-Detection Results on sub-GeV Dark Matter from a New Skipper CCD," Physical Review Letters, vol. 125, No. 17, p. 171802, 2020.

* cited by examiner

DEVICES, SYSTEMS, AND METHODS FOR TRITIUM GAS DETECTION

CROSS-REFERENCE TO RELATED APPLICATIONS

This application is a national stage application filed under 35 U.S.C. § 371 of PCT/US2023/029943 filed Aug. 10, 2023, which claims the benefit of priority to U.S. Provisional Application No. 63/396,908 filed Aug. 10, 2022, which is hereby incorporated herein by reference in its entirety.

BACKGROUND

Tritium is a radioactive isotope of hydrogen with two neutrons and one proton forming the nucleus. It has a half-life of 12.3 years. Tritium gas finds usage in a wide range of industrial applications.

Gas proportional counters have been used in the past for tritium detection by flowing gas through the counter. The inherent limitations in existing products and methods are the interferences from background radiation to the weak beta emission from tritium, low sensitivity to hydrogen and high sensitivity to pressure, and in some cases, heavy and bulky instruments to offer relatively higher sensitivity. Improved devices, systems, and methods for tritium gas detection are needed, particularly improved devices, systems, and methods for tritium gas detection with higher sensitivity, lower cost, lighter in weight, and/or smaller in size. The devices, systems, and methods discussed herein address this and other needs.

SUMMARY

In accordance with the purposes of the disclosed devices, systems, and methods as embodied and broadly described herein, the disclosed subject matter relates to devices, systems, and methods for tritium gas detection.

For example, disclosed herein are proportional counter-gas ionization devices for tritium gas detection, the devices comprising a fluid cell comprising a wall defining a chamber, wherein the chamber extending from a first end to a second end, the first end and the second end being opposite and axially spaced apart. The fluid cell further comprise an inlet and an outlet, the inlet comprising a first valve, and the outlet comprising a second valve. When the first valve is open, the inlet is in fluid communication with the chamber and the inlet is configured to provide a path for fluid flow into the chamber. When the second valve is open, the outlet is in fluid communication with the chamber and the outlet is configured to provide a path for fluid flow out of the chamber. When the first valve and the second valve are both closed, the fluid cell is fluid tight. The device further comprises a cathode, an anode, and a hydrogen sorption layer. The hydrogen sorption layer is a hydrogen absorption layer, a hydrogen adsorption layer, or a combination thereof. The hydrogen sorption layer comprises a metal that forms a metal hydride when hydrogen is absorbed and/or adsorbed. The hydrogen sorption layer coats the wall within the chamber. When the hydrogen sorption layer is heated after absorbing and/or adsorbing hydrogen, the metal hydride is configured to release the absorbed and/or adsorbed hydrogen into the chamber. A first portion of the anode is within the chamber and coaxial with the chamber, and a second portion of the anode extends through the wall outside the chamber. The wall is the cathode; or the cathode is a conduit disposed within the chamber and coaxial with the chamber, the conduit comprising a mesh wall defining a lumen, the conduit extending from a proximal end to a distal end, the proximal end and the distal end being opposite and axially spaced apart. The cathode is disposed peripherally around and coaxial with the anode. When the cathode and the anode are conductively coupled to a voltage source, the voltage source is configured to apply a voltage to the cathode and the anode to thereby operate the device as a proportional counter-gas ionization device for tritium gas detection.

In some examples, the hydrogen sorption layer comprises a metal selected from the group consisting of Ni, Ti, Pt, Pd, Mg, Li, Na, Al, Zn, Mn, Fe, La, Sn, Cu, Co, Ru, Ir, Se, Ca, Zr, Sc, stainless steel, or a combination thereof. In some examples, the hydrogen sorption layer comprises a metal selected from the group consisting of Pd, Mg, Ni, or a combination thereof. In some examples, the hydrogen sorption layer comprises Pd.

In some examples, the hydrogen sorption layer comprises carbon nanotubes, graphene, hydrogenated amorphous carbon, or a combination thereof.

In some examples, the hydrogen sorption layer comprises a plurality of particles, the plurality of particles comprising Ni, Ti, Pt, Pd, Mg, Li, Na, Al, Zn, Mn, Fe, La, Sn, Cu, Co, Ru, Ir, Se, Ca, Zr, Sc, stainless steel, carbon nanotubes, graphene, hydrogenated amorphous carbon, or a combination thereof. In some examples, the plurality of particles comprise Pd, Mg, Ni, or a combination thereof. In some examples, the plurality of particles comprise Pd.

In some examples, the hydrogen sorption layer has an average thickness of from 10 nanometers (nm) to 100 micrometers (microns, μm). In some examples, the hydrogen sorption layer has an average thickness of from 10 nanometers (nm) to 10 micrometers (microns, μm).

In some examples, the fluid cell has a cylindrical shape.

In some examples, the cathode is the conduit. In some examples, the conduit has a cylindrical shape.

In some examples, the device further comprises an insulator disposed around the anode at the wall, the insulator configured to insulate the anode from the cathode.

In some examples, the device further comprises a component configured to increase turbulence of fluid flow and/or residence time of a fluid sample within the chamber. In some examples, the component comprises a baffle, a fan, a blower, or a combination thereof.

In some examples, the device is only sensitive to ionization from tritium beta decay.

In some examples, the device further comprises a heater configured to heat the wall to thereby heat the layer after absorbing and/or adsorbing hydrogen.

Also disclosed herein are systems comprising any of the devices disclosed herein. In some examples, the system further comprises a pump configured to inject a fluid into the chamber via the inlet with an open first valve and/or withdraw a fluid from the chamber via the outlet with an open second valve. In some examples, the system further comprises an electrolyzer in fluid communication with the inlet of the device, the inlet being configured to receive electrolyzed products from the electrolyzer.

Also disclosed herein are methods for detecting tritium gas using any of the devices disclosed herein and/or any of the systems disclosed herein.

In some examples, the method comprises applying a voltage to the cathode and the anode to operate the device as a proportional counter-gas ionization device for tritium gas detection. In some examples, the chamber is filled with a detection sample, the detection sample comprising a purge fluid and hydrogen desorbed from the metal hydride. In some examples, the metal hydride was formed by the hydrogen sorption layer absorbing and/or adsorbing hydrogen from a fluid sample, the fluid sample comprising hydrogen and the fluid sample having been purged from the chamber before the voltage is applied.

In some examples, the method comprises at least partially filling the chamber with the fluid sample, such that the fluid sample contacts the hydrogen sorption layer and the hydrogen sorption layer absorbs and/or adsorbs hydrogen from the fluid sample, thereby forming the metal hydride. In some examples, the method further comprises subsequently purging the chamber by at least partially filling the chamber with a purge fluid thereby pushing the fluid sample out of the chamber. In some examples, the methods further comprises subsequently heating the hydrogen sorption layer to release the absorbed and/or adsorbed hydrogen from the metal hydride into the chamber, thereby forming the detection sample within the chamber. In some examples, the method further comprises subsequently applying the voltage to the cathode and the anode to thereby operate the device as a proportional counter-gas ionization device for tritium gas detection.

In some examples, at least partially filling the chamber with the fluid sample comprises flowing the fluid sample into the chamber through the inlet, wherein the first valve is open and the second valve is closed, such that the fluid sample accumulates within and at least partially fills the chamber. In some examples, the method further comprises closing the first valve after the chamber is at least partially filled with the fluid sample.

In some examples, purging the chamber comprises flowing the purge fluid into the chamber through the inlet such that the fluid sample flows out of the chamber through the outlet. In some examples, the method further comprises opening the first valve and the second valve, and flowing the purge fluid into the chamber through the inlet such that the fluid sample flows out of the chamber through the outlet. In some examples, the method further comprises closing the first valve and the second valve after the fluid sample flows out of the chamber, such that the chamber is at least partially filled with the purge fluid.

In some examples, the method further comprises collecting a signal from the device. In some examples, the method further comprises processing the signal to determine the presence of tritium gas, the concentration of tritium gas, the activity of tritium gas, or a combination thereof.

In some examples, the method further comprises subsequently evacuating the chamber.

In some examples, evacuating the chamber comprises opening the second valve and flowing the detection sample out of the chamber through the outlet.

In some examples, the method further comprises subsequently repeating the method with another fluid sample.

In some examples, the fluid sample comprises a liquid, a gas, or a combination thereof.

In some examples, the fluid sample is a gas, such that the fluid sample is a gaseous sample. In some examples, the fluid sample comprises HT, $T_2$, $H_2$, HTO, or a combination thereof.

In some examples, the fluid sample is contacted with the hydrogen sorption layer for an amount of time of from 1 minute to 36 hours.

In some examples, the purge fluid comprises a liquid, a gas, or a combination thereof. In some examples, the purge fluid is a gas, such that the purge fluid comprises a purge gas. In some examples, the purge fluid comprises a fill gas and a working gas. In some examples, the fill gas comprises an inert gas, such as argon. In some examples, the working gas comprises $CH_4$, $CH_2CH_2$, or a combination thereof. In some examples, the purge fluid comprises Ar, $CH_4$, $CH_2CH_2$, or a combination thereof. In some examples, the purge fluid comprises 90% argon with 10% methane, 100% argon, 100% methane, or 55% Ar with 45% $CH_2CH_2$. In some examples, the purge fluid comprises Ar and $CH_4$. In some examples, the purge fluid comprises 90% Ar and 10% $CH_4$. In some examples, the purge fluid is substantially free of beta emitters, alpha emitters, and X-ray emitters.

Additional advantages of the disclosed devices, systems, and methods will be set forth in part in the description which follows, and in part will be obvious from the description. The advantages of the disclosed devices, systems, and methods will be realized and attained by means of the elements and combinations particularly pointed out in the appended claims. It is to be understood that both the foregoing general description and the following detailed description are exemplary and explanatory only and are not restrictive of the disclosed devices, systems, and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure. However, the present disclosure is not limited to the precise arrangements shown, and the drawings are not necessarily drawn to scale.

DETAILED DESCRIPTION

Figure 1:
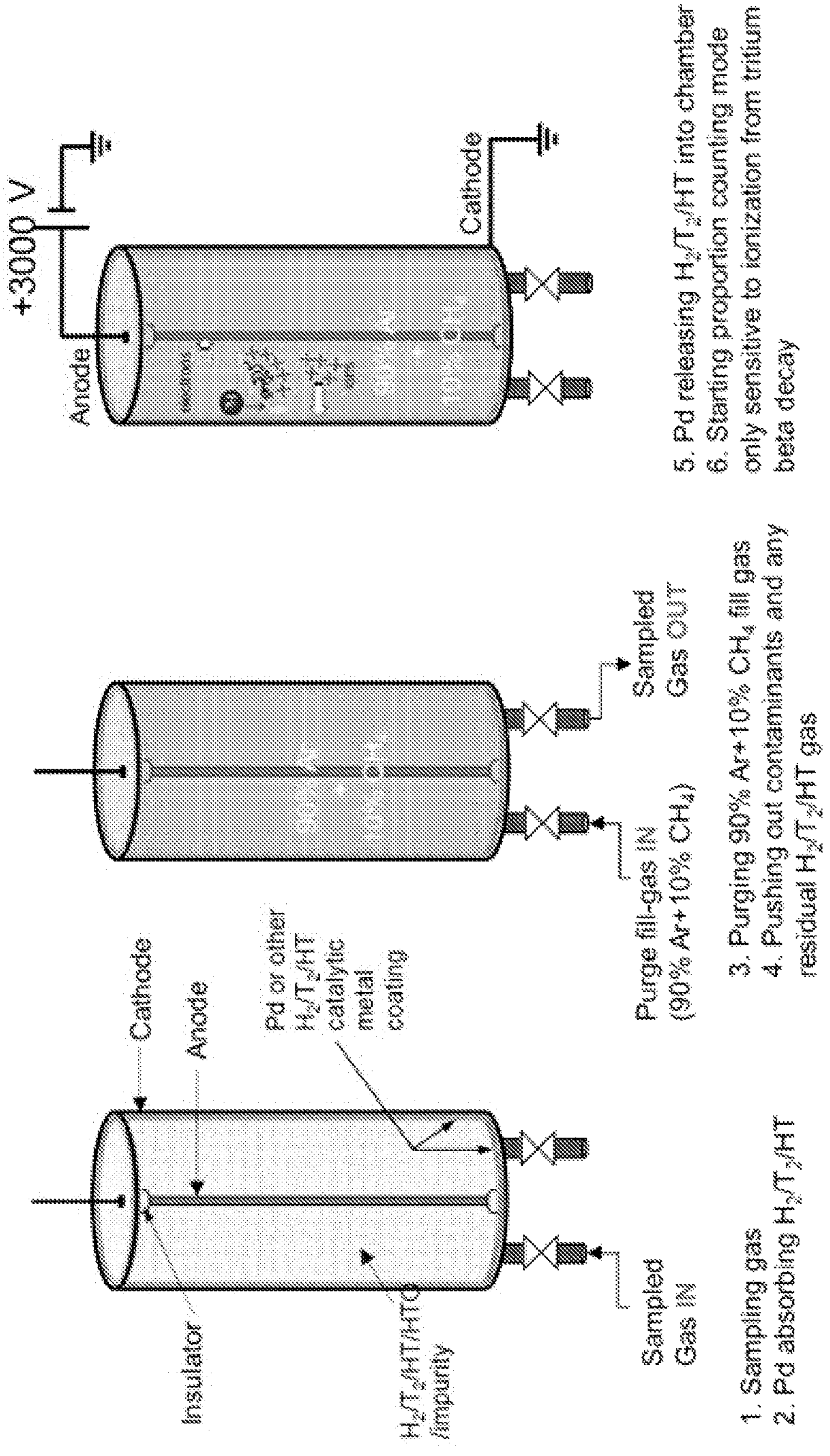
FIG. 1. Schematic diagram of an example device and/or method as disclosed herein according to one implementation.

The devices, systems, and methods described herein may be understood more readily by reference to the following detailed description of specific aspects of the disclosed subject matter and the Examples included therein.

Before the present devices, systems, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps. As used in the specification and in the claims, the term "comprising" can include the aspects "consisting of" and "consisting essentially of."

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, a description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

When the specific values are disclosed between two end values, it is understood that these end values can also be included.

For the terms "for example" and "such as," and grammatical equivalences thereof, the phrase "and without limitation" is understood to follow unless explicitly stated otherwise. It is further understood that these phrases are used not used in a restrictive sense, but for explanatory purposes. "Exemplary" means "an example of" and is not intended to convey an indication of a preferred or ideal embodiment.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Spatially relative terms, such as "beneath," "below," "lower," "above," "upper," "bottom," "top," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein are interpreted accordingly.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

As used herein, the term "and/or" includes any and all combinations of one or more of the associated listed items.

As used herein, the term "substantially" means that the subsequently described event or circumstance completely occurs or that the subsequently described event or circumstance generally, typically, or approximately occurs.

Still further, the term "substantially" can, in some aspects, refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is then about 1% by weight, e.g., less than about 0.5% by weight, less than about 0.1% by weight, less than about 0.05% by weight, or less than about 0.01% by weight of the stated material, based on the total weight of the composition.

The expressions "ambient temperature" and "room temperature" as used herein are understood in the art and refer generally to a temperature from about 20° C. to about 35° C.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight of component Y, X, and Y are present at a weight ratio of 2:5 and are present in such a ratio regardless of whether additional components are contained in the mixture.

A weight percent (wt. %) of a component, unless specifically stated to the contrary, is based on the total weight of the formulation or composition in which the component is included.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred in any respect. This holds for any possible non-express basis for interpretation, including matters of logic with respect to the arrangement of steps or operational flow, plain meaning derived from grammatical organization or punctuation, or the number or type of aspects described in the specification.

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, a "fluid" includes a liquid, a gas, a supercritical fluid, or a combination thereof.

Devices

Disclosed herein are devices, systems, and methods for tritium gas detection. For example, disclosed herein are proportional counter-gas ionization devices for tritium gas detection.

Referring now to FIG. 7-FIG. 10, disclosed herein are proportional counter-gas ionization devices 100 for tritium gas detection, wherein the devices 100 comprise a fluid cell 102 comprising a wall 104 defining a chamber 106. The chamber 106 extends from a first end 108 to a second end 110, the first end 108 and the second end 110 being opposite and axially spaced apart. The wall 104 can comprise any suitable material, such as those known in the art.

The fluid cell 102 further comprises an inlet 112 and an outlet 114. The inlet 112 comprises a first valve 113 and the outlet 114 comprising a second valve 115. When the first valve 113 is open, the inlet 112 is in fluid communication with the chamber 106 and the inlet 112 is configured to provide a path for fluid flow into the chamber 106. When the second valve 115 is open, the outlet 114 is in fluid communication with the chamber 106 and the outlet 114 is configured to provide a path for fluid flow out of the chamber 106. When the first valve 113 and the second valve 115 are both closed, the fluid cell 102 is fluid tight.

The fluid cell 102 can have any suitable shape and/or dimensions. For example, the fluid cell 102 can be a polyhedron (e.g., a platonic solid, a prism, a pyramid), a cylinder, a hemicylinder, an elliptical cylinder, a hemi-elliptical cylinder, a cone, a semicone, etc. In some examples, the fluid cell 102 has a cylindrical shape.

The fluid cell 102 has a longitudinal axis. The fluid cell 102 can have a cross-sectional shape in a plane perpendicular to the longitudinal axis, wherein the cross-sectional shape can be any shape, such as a regular shape, an irregular shape, an isotropic shape, or an anisotropic shape. In some examples, the cross-sectional shape of the fluid cell 102 can be substantially circular, ovate, ovoid, elliptic, triangular, rectangular, polygonal, etc. In some examples, the cross-sectional shape of the fluid cell 102 can be substantially circular, ovate, ovoid, or elliptic. In some examples, the cross-sectional shape of the fluid cell 102 can be substantially circular.

The device further comprise a hydrogen sorption layer 120, the hydrogen sorption layer 120 being a hydrogen absorption layer, a hydrogen adsorption layer, or a combination thereof. The hydrogen sorption layer 120 coats the wall 104 within the chamber 106.

The hydrogen sorption layer 120 comprises a metal that forms a metal hydride when hydrogen is absorbed and/or adsorbed. When the hydrogen sorption layer 120 is heated after absorbing and/or adsorbing hydrogen, the metal hydride is configured to release the absorbed and/or adsorbed hydrogen into the chamber. As used herein, the "hydrogen" absorbed, adsorbed, and/or desorbed by the hydrogen sorption layer 120 can comprise one or more isotopes of hydrogen, such as hydrogen gas ($H_2$), tritium gas ($T_2$), HT, or a combination thereof.

In some examples, the hydrogen sorption layer 120 comprises a metal selected from the group consisting of Ni, Ti, Pt, Pd, Mg, Li, Na, Al, Zn, Mn, Fe, La, Sn, Cu, Co, Ru, Ir, Se, Ca, Zr, Sc, stainless steel, or a combination thereof. In some examples, the hydrogen sorption layer 120 can comprise carbon nanotubes, graphene, hydrogenated amorphous carbon, or a combination thereof. In some examples, the hydrogen sorption layer 120 comprises a metal selected from the group consisting of Pd, Mg, Ni, or a combination thereof. In some examples, the hydrogen sorption layer 120 comprises Pd.

In some examples, the hydrogen sorption layer 120 can comprise a plurality of particles, the plurality of particles comprising Ni, Ti, Pt, Pd, Mg, Li, Na, Al, Zn, Mn, Fe, La, Sn, Cu, Co, Ru, Ir, Se, Ca, Zr, Sc, stainless steel, carbon nanotubes, graphene, hydrogenated amorphous carbon, or a combination thereof. In some examples, the plurality of particles can comprise Pd, Mg, Ni, or a combination thereof. In some examples, the plurality of particles can comprise Pd.

The hydrogen sorption layer 120 can have an average thickness. The average thickness of the hydrogen sorption layer 120 can be selected, for example, in view of the composition of the hydrogen sorption layer 120, the composition and nature of the fluid sample, the dimensions of the fluid cell, or a combination thereof.

For example, the hydrogen sorption layer 120 can have an average thickness of 10 nanometers (nm) or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (micron, μm) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, or 90 μm or more). In some examples, the hydrogen sorption layer 120 can have an average thickness of 100 micrometers (microns, μm) or less (e.g., 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2.25 μm or less, 2 μm or less, 1.75 μm or less, 1.5 μm or less, 1.25 μm or less, 1 μm or less, 900 nanometers (nm) or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the hydrogen sorption layer 120 can range from any of the minimum values described above to any of the maximum values described above. For example, the hydrogen sorption layer 120 can have an average thickness of from 10 nanometers (nm) to 100 micrometers (microns, μm) (e.g., from 10 nm to 1 micron, from 1 micron to 100 microns, from 10 nm to 100 nm, from 100 nm to 1 micron, from 1 micron to 10 microns, from 10 microns to 100 microns, from 10 nm to 50 microns, from 10 nm to 25 microns, from 10 nm to 10 microns, from 10 nm to 5 microns, from 10 nm to 750 nm, from 10 nm to 500 nm, from 10 nm to 250 nm, from 50 nm to 100 microns, from 75 nm to 100 microns, from 100 nm to 100 microns, from 250 nm to 100 microns, from 500 nm to 100 microns, from 750 nm to 100 microns, from 5 microns to 100 microns, from 25 microns to 100 microns, from 25 nm to 75 microns, from 50 nm to 50 microns, or from 100 nm to 10 microns). In some examples, the hydrogen sorption layer 120 has an average thickness of from 10 nanometers (nm) to 10 micrometers (microns, μm).

The devices 100 further comprise an anode 118. The anode 118 can comprise any suitable material, such as those known in the art. A first portion of the anode **118*a* is within the chamber 106 and coaxial with the chamber 106, and a second portion of the anode 118*b* extends through the wall 104 outside the chamber 106**.

The devices 100 further comprise a cathode 116. The cathode 116 can comprise any suitable material, such as those known in the art. The cathode 116 is disposed peripherally around and coaxial with the anode 118. For example, the cathode 116 can be disposed circumferentially around and coaxial with the anode 118.

Figure 7:
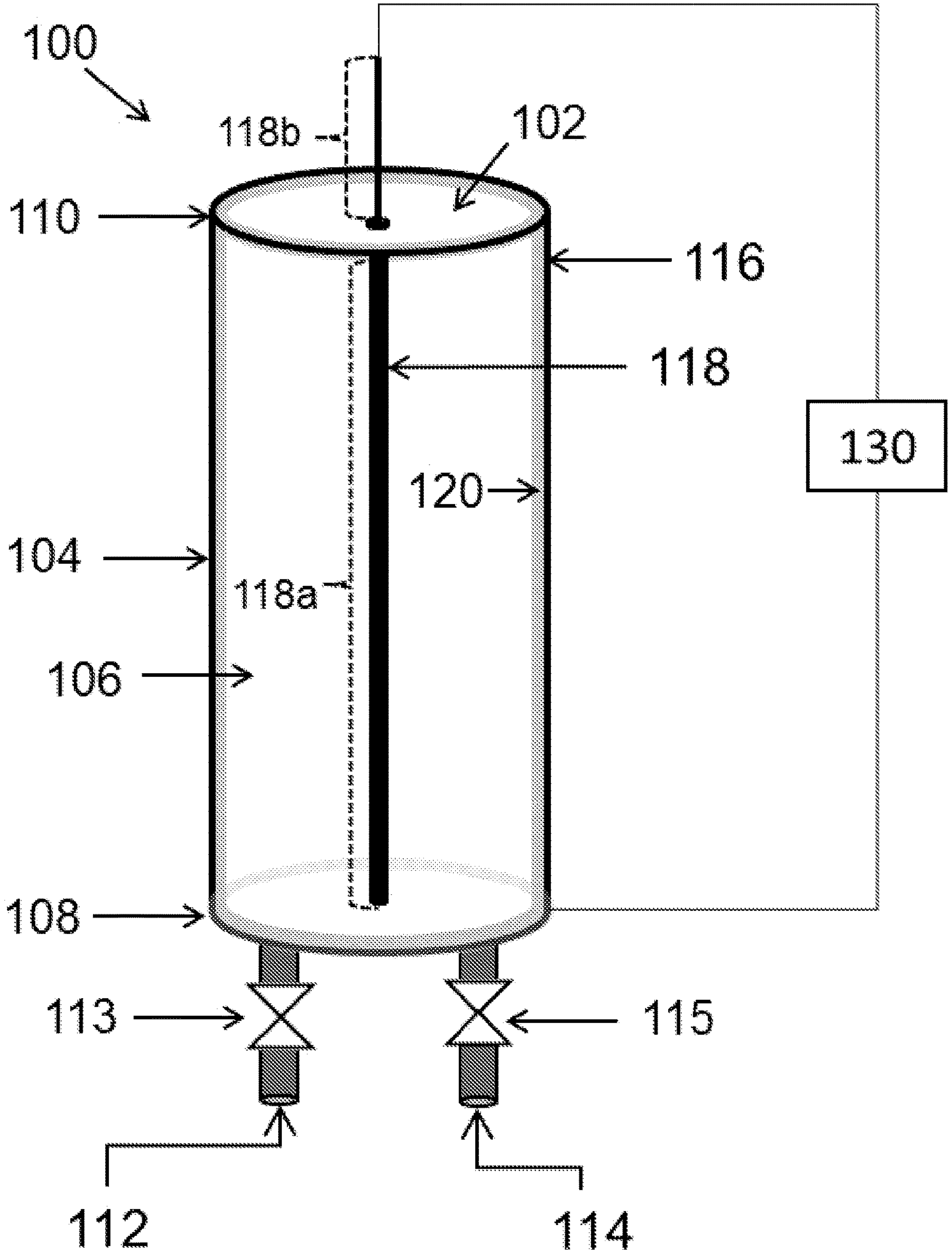
FIG. 7. Schematic diagram of an example device as disclosed herein according to one implementation.
Figure 9:
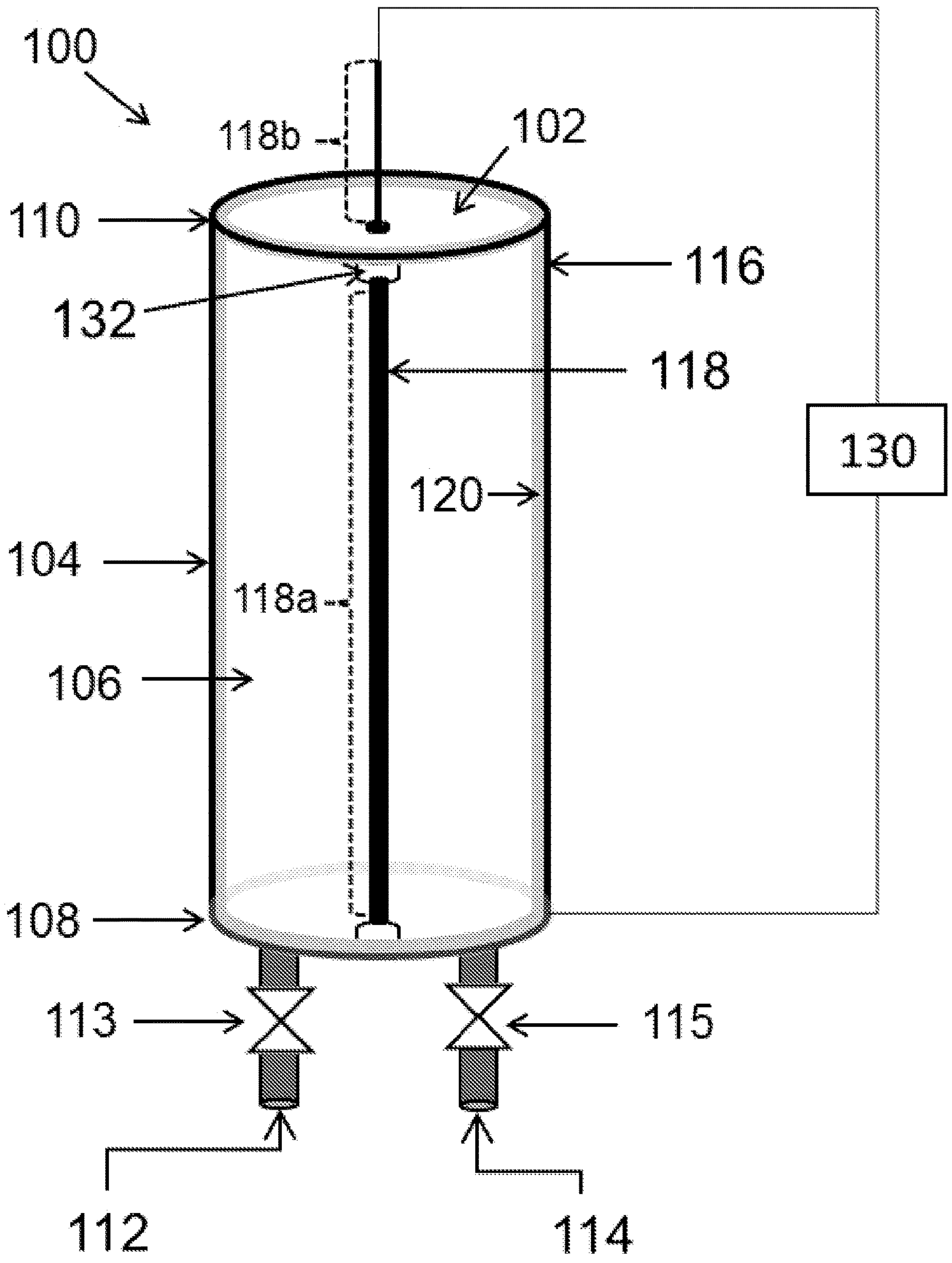
FIG. 9. Schematic diagram of an example device as disclosed herein according to one implementation.

In some examples, the wall 104 is the cathode 116, as shown in FIG. 7 and FIG. 9.

Figure 8:
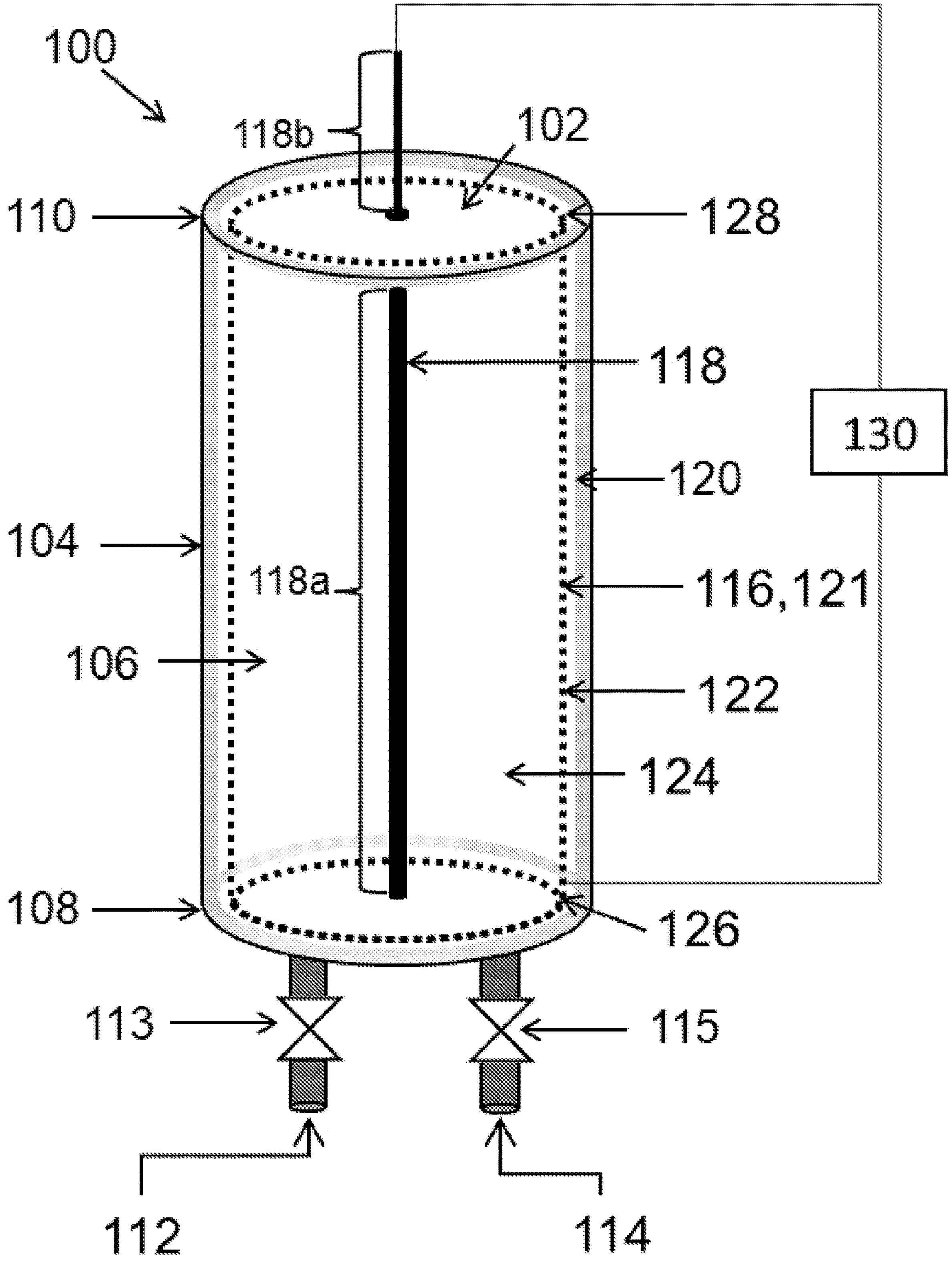
FIG. 8. Schematic diagram of an example device as disclosed herein according to one implementation.
Figure 10:
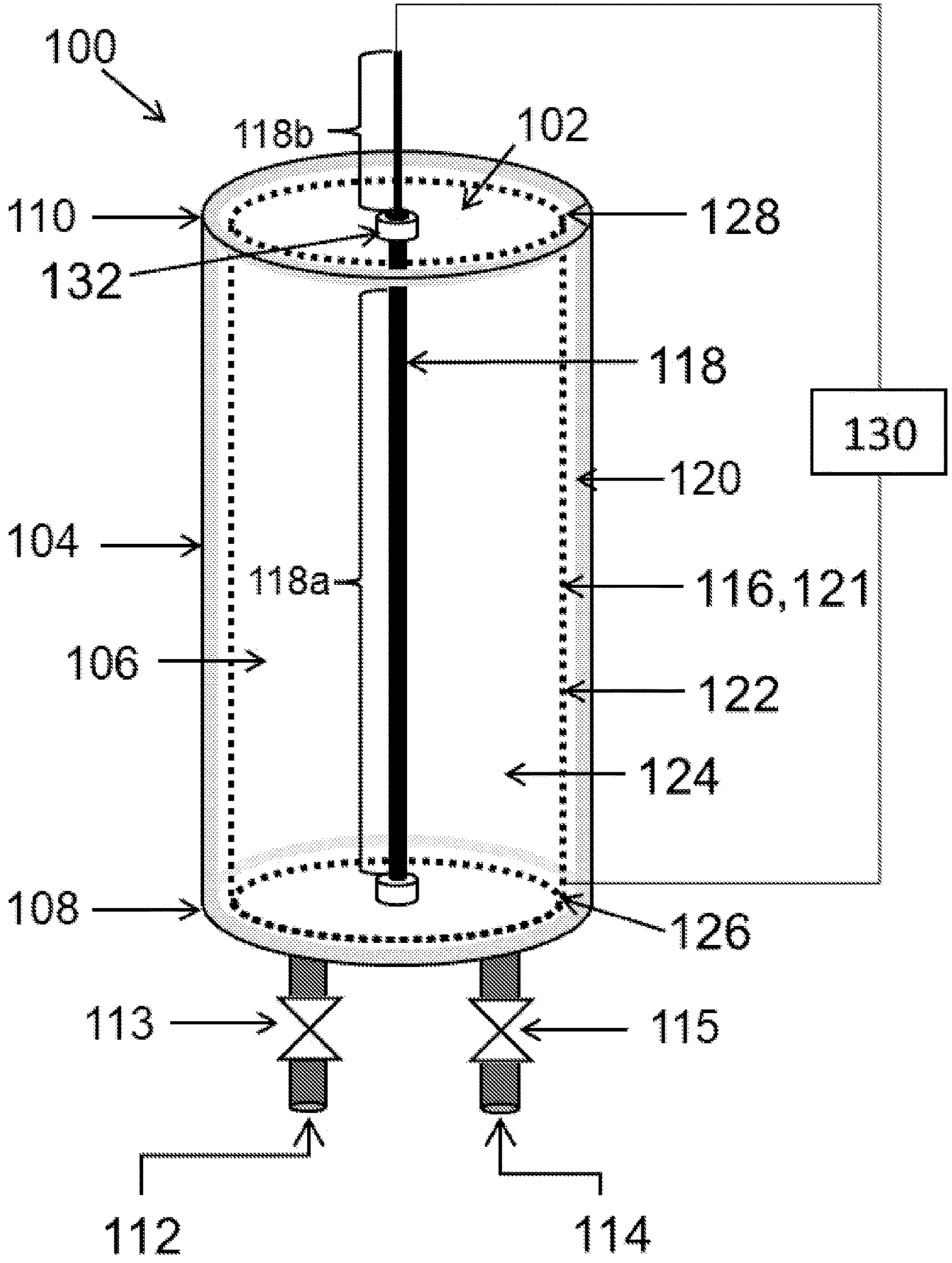
FIG. 10. Schematic diagram of an example device as disclosed herein according to one implementation.

In some examples, the cathode 116 is a conduit 121 disposed within the chamber 106 and coaxial with the chamber, as shown in FIG. 8 and FIG. 10. In some examples, the wall 104 is disposed circumferentially around and coaxially with the conduit 121. The conduit 121 comprises a mesh wall 122 defining a lumen 124. The conduit 121 extends from a proximal end 126 to a distal end 128, the proximal end 126 and the distal end 128 being opposite and axially spaced apart.

The conduit 121 can have any suitable shape and/or dimensions. For example, the conduit 121 can be a polyhedron (e.g., a platonic solid, a prism, a pyramid), a cylinder, a hemicylinder, an elliptical cylinder, a hemi-elliptical cylinder, a cone, a semicone, etc. In some examples, the conduit 121 has a cylindrical shape.

The conduit 121 has a longitudinal axis. The conduit 121 can have a cross-sectional shape in a plane perpendicular to the longitudinal axis, wherein the cross-sectional shape can be any shape, such as a regular shape, an irregular shape, an isotropic shape, or an anisotropic shape. In some examples, the cross-sectional shape of the conduit 121 can be substantially circular, ovate, ovoid, elliptic, triangular, rectangular, polygonal, etc. In some examples, the cross-sectional shape of the conduit 121 can be substantially circular, ovate, ovoid, or elliptic. In some examples, the cross-sectional shape of the conduit 121 can be substantially circular.

When the cathode 116 and the anode 118 are conductively coupled to a voltage source 130, the voltage source 130 is configured to apply a voltage to the cathode 116 and the anode 118 to thereby operate the device 100 as a proportional counter-gas ionization device for tritium gas detection.

In some examples, the device 100 can further comprise an insulator 132 disposed around the anode 118 at the wall 104, as shown in FIG. 9 and FIG. 10. The insulator 132 is configured to insulate the anode from the cathode. The insulator 132 can be any suitable electrical insulator.

In some examples, the device 100 can further comprise a component configured to increase turbulence of fluid flow and/or residence time of a fluid sample within the chamber. For example, the component can comprise a baffle, a fan, a blower, or a combination thereof.

In some examples, the device 100 is only sensitive to ionization from tritium beta decay.

In some examples, the device 100 can further comprise a heater configured to heat the wall 104 to thereby heat the hydrogen sorption layer 120 after absorbing and/or adsorbing hydrogen.

Figure 11:
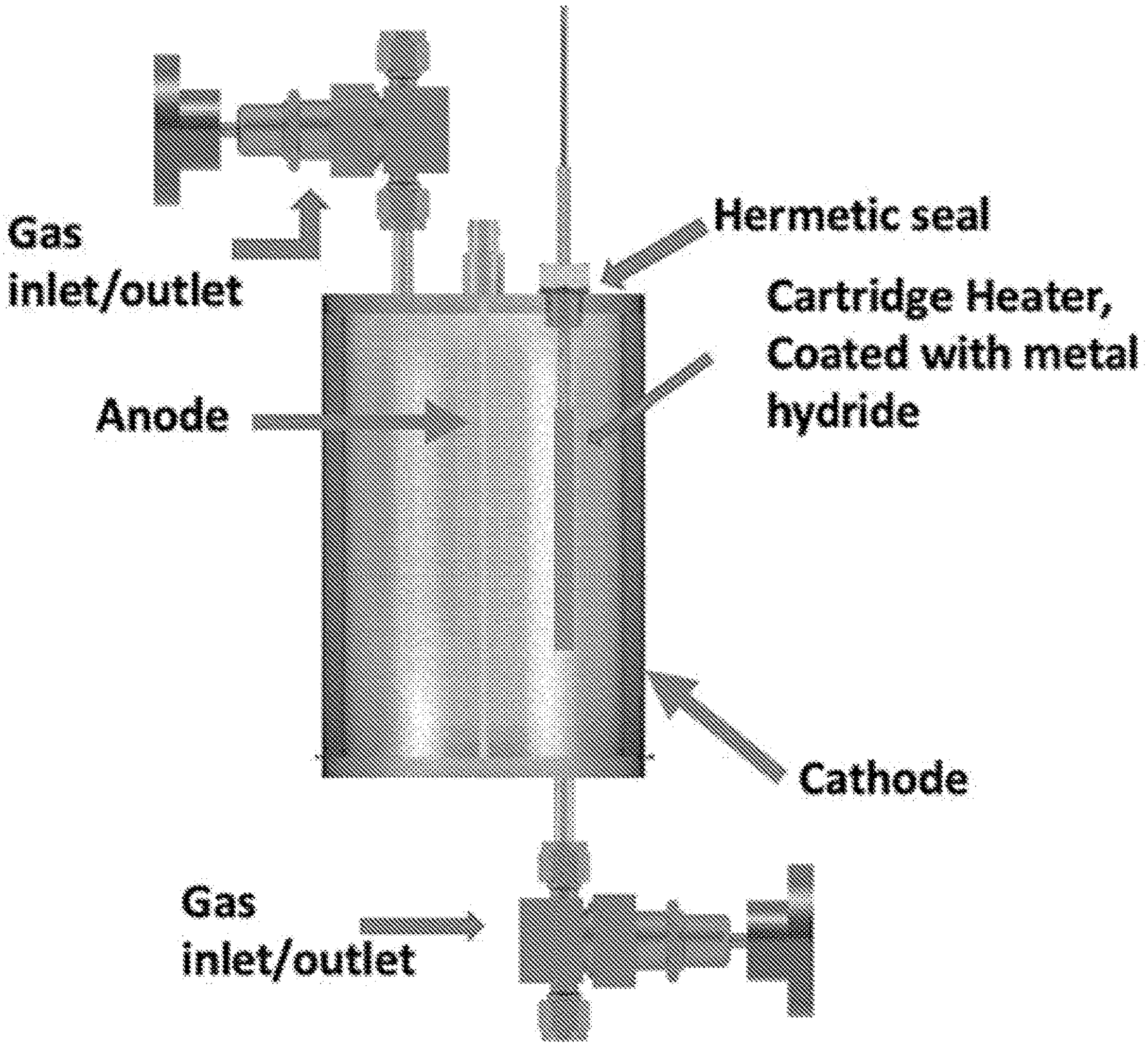
FIG. 11. Schematic diagram of an example tritium gas detector device with a heating element included.

In some examples, the device 100 can include a cartridge heater, as shown in FIG. 11.

In some examples, the device 100 can be filled with air, moist, argon gas, hydrogen gas, or a combination thereof. In some examples, the device 100 can be filled with a mixture of argon and hydrogen gas.

Systems

Also disclosed herein are systems comprising any of the devices 100 disclosed herein.

In some examples, the system further comprises a pump configured to inject a fluid into the chamber 106 via the inlet 112 with an open first valve 113 and/or withdraw a fluid from the chamber 106 via the outlet 114 with an open second valve 115. The pump can comprise any suitable type of pump, such as those known in the art.

In some examples, the system further comprises an electrolyzer in fluid communication with the inlet 112 of the device 100, the inlet 112 being configured to receive electrolyzed products from the electrolyzer.

Methods

Also disclosed herein are methods for detecting tritium gas using any of the devices 100 disclosed herein or any of the systems disclosed herein.

The methods comprise applying a voltage to the cathode 116 and the anode 118 to operate the device 100 as a proportional counter-gas ionization device for tritium gas detection; wherein the chamber 106 is filled with a detection sample, the detection sample comprising a purge fluid and hydrogen desorbed from the metal hydride; the metal hydride having been formed by the hydrogen sorption layer 120 absorbing and/or adsorbing hydrogen from a fluid sample, the fluid sample comprising hydrogen and the fluid sample having been purged from the chamber 106 before the voltage is applied.

In some examples, the methods comprise at least partially filling the chamber 106 with the fluid sample, such that the fluid sample contacts the hydrogen sorption layer 120 and the hydrogen sorption layer 120 absorbs and/or adsorbs hydrogen from the fluid sample, thereby forming the metal hydride. In some examples, the methods further comprise subsequently purging the chamber 106 by at least partially filling the chamber 106 with a purge fluid thereby pushing the fluid sample out of the chamber 106. In some examples, the methods further comprise subsequently heating the hydrogen sorption layer 120 to release the absorbed and/or adsorbed hydrogen from the metal hydride into the chamber 106, thereby forming the detection sample within the chamber 106. In some examples, the methods further comprise subsequently applying the voltage to the cathode 116 and the anode 118 to thereby operate the device 100 as a proportional counter-gas ionization device for tritium gas detection.

In some examples, at least partially filling the chamber 106 with the fluid sample comprises flowing the fluid sample into the chamber 106 through the inlet 112, wherein the first valve 113 is open and the second valve 115 is closed, such that the fluid sample accumulates within and at least partially fills the chamber 106. In some examples, the methods further comprise closing the first valve 113 after the chamber 106 is at least partially filled with the fluid sample.

In some examples, purging the chamber 106 comprises flowing the purge fluid into the chamber 106 through the inlet 112 such that the fluid sample flows out of the chamber 106 through the outlet 114. In some examples, the methods further comprise opening the first valve 113 and the second valve 115, and flowing the purge fluid into the chamber 106 through the inlet 112 such that the fluid sample flows out of the chamber 106 through the outlet 114. In some examples, the methods further comprise closing the first valve 113 and the second valve 115 after the fluid sample flows out of the chamber 106, such that the chamber 106 is at least partially filled with the purge fluid.

In some examples, the methods further comprise collecting a signal from the device 100. In some examples, the methods further comprise processing the signal to determine the presence of tritium gas, the concentration of tritium gas, the activity of tritium gas, or a combination thereof.

In some examples, the methods further comprise subsequently evacuating the chamber. In some examples, evacuating the chamber comprises opening the second valve 115 and flowing the detection sample out of the chamber 106 through the outlet 114.

In some examples, the methods further comprise subsequently repeating the method with another fluid sample.

In some examples, the fluid sample comprises a liquid, a gas, or a combination thereof. In some examples, the fluid sample is a gas, such that the fluid sample is a gaseous sample.

In some examples, the fluid sample comprises HT, $T_2$, $H_2$, HTO, or a combination thereof.

The temperature, pressure, and/or time for which the fluid sample is contacted with the hydrogen sorption layer 120 can be selected in view of a variety of factors. For example, temperature, pressure, and/or time for which the fluid sample is contacted with the hydrogen sorption layer 120 can be selected in view of the composition of the hydrogen sorption layer, the thickness of the hydrogen sorption layer, the composition and nature of the fluid sample, the dimensions of the fluid cell, or a combination thereof.

In some examples, the fluid sample is contacted with the hydrogen sorption layer 120 for an amount of time of 1 minute or more (e.g., 2 minutes or more, 3 minutes or more, 4 minutes or more, 5 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.25 hours or more, 1.5 hours or more, 1.75 hours or more, 2 hours or more, 2.25 hours or more, 2.5 hours or more, 2.75 hours or more, 3 hours or more, 3.5 hours or more, 4 hours or more, 4.5 hours or more, 5 hours or more, 5.5 hours or more, 6 hours or more, 7 hours or more, 8 hours or more, 9 hours or more, 10 hours or more, 11 hours or more, 12 hours or more, 13 hours or more, 14 hours or more, 15 hours or more, 16 hours or more, 17 hours or more, 18 hours or more, 19 hours or more, 20 hours or more, 21 hours or more, 22 hours or more, 23 hours or more, 24 hours or more, 25 hours or more, 26 hours or more, 27 hours or more, 28 hours or more, 29 hours or more, 30 hours or more, 31 hours or more, 32 hours or more, 33 hours or more, 34 hours or more, or 35 hours or more). In some examples, the fluid sample is contacted with the hydrogen sorption layer 120 for an amount of time of 36 hours or less (e.g., 35 hours or less, 34 hours or less, 33 hours or less, 32 hours or less, 31 hours or less, 30 hours or less, 29 hours or less, 28 hours or less, 27 hours or less, 26 hours or less, 25 hours or less, 24 hours or less, 23 hours or less, 22 hours or less, 21 hours or less, 20 hours or less, 19 hours or less, 18 hours or less, 17 hours or less, 16 hours or less, 15 hours or less, 14 hours or less, 13 hours or less, 12 hours or less, 11 hours or less, 10 hours or less, 9 hours or less, 8 hours or less, 7 hours or less, 6 hours or less, 5.5 hours or less, 5 hours or less, 4.5 hours or less, 4 hours or less, 3.5 hours or less, 3 hours or less, 2.75 hours or less, 2.5 hours or less, 2.25 hours or less, 2 hours or less, 1.75 hours or less, 1.5 hours or less, 1.25 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 5 minutes or less, 4 minutes or less, 3 minutes or less, or 2 minutes or less). The amount of time for which the fluid sample contacts the hydrogen sorption layer 120 can range from any of the minimum values described above to any of the maximum values described above. For example, the fluid sample can be contacted with the hydrogen sorption layer 120 for an amount of time of from 1 minute to 36 hours (e.g., from 1 minute to 18 hours, from 18 hours to 36 hours, from 1 minute to 12 hours, from 12 hours to 24 hours, from 24 hours to 36 hours, from 1 minute to 30 hours, from 1 minute to 24 hours, from 1 minute to 6 hours, from 1 minute to 1 hour, from 10 minutes to 36 hours, from 1 hour to 36 hours, from 6 hours to 36 hours, from 12 hours to 36 hours, from 10 minutes to 32 hours, from 30 minutes to 24 hours, or from 1 hour to 24 hours).

In some examples, the purge fluid comprises a liquid, a gas, or a combination thereof. In some examples, the purge fluid is a gas, such that the purge fluid comprises a purge gas.

In some examples, the purge fluid comprises a fill gas and a working gas. In some examples, the fill gas comprises an inert gas, such as argon. In some examples, the working gas comprises $CH_4$, $CH_2CH_2$, or a combination thereof.

In some examples, the purge fluid comprises Ar, $CH_4$, $CH_2CH_2$, or a combination thereof. In some examples, the purge fluid comprises 90% argon with 10% methane, 100% argon, 100% methane, or 55% Ar with 45% $CH_2CH_2$.

In some examples, the purge fluid comprises Ar and $CH_4$.

In some examples, the purge fluid comprises a mixture of Ar and $CH_4$. The mixture can, for example, comprise 1% Ar or more (e.g., 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more). In some examples, the mixture comprises 99% Ar or less (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of Ar in the mixture can range from any of the minimum values described above to any of the maximum values described above. For example, the mixture can comprise from 1% to 99% Ar (e.g., from 1% to 50%, from 50% to 99%, from 1% to 30%, from 30% to 60%, from 60% to 99%, from 1% to 90%, from 1% to 75%, from 1% to 25%, from 1% to 10%, from 5% to 99%, from 10% to 99%, from 25% to 99%, from 75% to 99%, from 5% to 95%, or from 10% to 90%). The mixture can, for example, comprise 1% $CH_4$ or more (e.g., 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more). In some examples, the mixture comprises 99% $CH_4$ or less (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of $CH_4$ in the mixture can range from any of the minimum values described above to any of the maximum values described above. For example, the mixture can comprise from 1% to 99% $CH_4$ (e.g., from 1% to 50%, from 50% to 99%, from 1% to 30%, from 30% to 60%, from 60% to 99%, from 1% to 90%, from 1% to 75%, from 1% to 25%, from 1% to 10%, from 5% to 99%, from 10% to 99%, from 25% to 99%, from 75% to 99%, from 5% to 95%, or from 10% to 90%). In some examples, the mixture comprises 1-99% Ar and 1-99% $CH_4$, the total amount of Ar and $CH_4$ in the mixture adding to 100%.

In some examples, the purge fluid comprises 90% Ar and 10% $CH_4$.

In some examples, the purge fluid comprises a mixture of Ar and $CH_2CH_2$. The mixture can, for example, comprise 1% Ar or more (e.g., 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more). In some examples, the mixture comprises 99% Ar or less (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of Ar in the mixture can range from any of the minimum values described above to any of the maximum values described above. For example, the mixture can comprise from 1% to 99% Ar (e.g., from 1% to 50%, from 50% to 99%, from 1% to 30%, from 30% to 60%, from 60% to 99%, from 1% to 90%, from 1% to 75%, from 1% to 25%, from 1% to 10%, from 5% to 99%, from 10% to 99%, from 25% to 99%, from 75% to 99%, from 5% to 95%, or from 10% to 90%). The mixture can, for example, comprise 1% $CH_2CH_2$ or more (e.g., 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more). In some examples, the mixture comprises 99% $CH_2CH_2$ or less (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of $CH_2CH_2$ in the mixture can range from any of the minimum values described above to any of the maximum values described above. For example, the mixture can comprise from 1% to 99% $CH_2CH_2$ (e.g., from 1% to 50%, from 50% to 99%, from 1% to 30%, from 30% to 60%, from 60% to 99%, from 1% to 90%, from 1% to 75%, from 1% to 25%, from 1% to 10%, from 5% to 99%, from 10% to 99%, from 25% to 99%, from 75% to 99%, from 5% to 95%, or from 10% to 90%). In some examples, the mixture comprises 1-99% Ar and 1-99% $CH_2CH_2$, the total amount of Ar and $CH_2CH_2$ in the mixture adding to 100%. In some examples, the mixture can comprise 55% Ar with 45% $CH_2CH_2$.

In some examples, the purge fluid comprises a mixture of argon and hydrogen.

In some examples, the purge fluid is substantially free of beta emitters, alpha emitters, and X-ray emitters.

The temperature, pressure, and/or time for which the hydrogen sorption layer 120 is heated to release the absorbed and/or adsorbed hydrogen from the metal hydride can be selected in view of a variety of factors. For example, temperature, pressure, and/or time for which the hydrogen sorption layer 120 is heated to release the absorbed hydrogen from the metal hydride can be selected in view of the composition of the hydrogen sorption layer, the thickness of the hydrogen sorption layer, the composition and nature of the absorbed and/or adsorbed hydrogen, the dimensions of the fluid cell, or a combination thereof.

In some examples, the device can be filled with a filling fluid. The filling fluid can, for example, comprise air, moist, argon gas, hydrogen gas, $CH_4$, $CH_2CH_2$, or a combination thereof. In some examples, the filling fluid comprises Ar and $CH_4$. In some examples, the filling fluid comprises 90% Ar and 10% $CH_4$. In some examples, the filling fluid comprises air.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Described herein are devices, systems, and methods that couple metal and gas (MEGA) for tritium gas detection. These devices, systems, and methods relate to a MEGA gas proportional counter, which comprises a metal hydride activated proportional counter for tritium gas detection.

The hydrogen or hydrogen-containing gas can be firstly sampled into the chamber, where they will be absorbed/dissolved into hydrogen absorbing/adsorbing materials forming metal hydride; the chamber will then be purged with filling gas to remove residual gas and then apply high temperature to release hydrogen gas back into the chamber. The subsequent detection will be in a standard gas proportion counter detection more where only tritium will be detected.

Gas proportional counters have been used in the past for tritium detection by flowing gas through the counter. The sampling gas/air that contains tritium in one of its chemical forms ($H_2/T_2$/HT) is flowed into the counter along with other radioactive contaminants such as Radon, C-14, or other alpha/beta emitting radionuclides. The inherent limitations in existing products are the interferences from background radiation to the weak beta emission from tritium, low sensitivity to hydrogen and high sensitivity to pressure.

A schematic diagram of an example system and/or method as disclosed herein according to one implementation is shown in FIG. 1.

In the MEGA proportional counter design, the methods of use can comprise:

Step 1: The sampling gas containing HT/$T_2$/$H_2$/HTO is flowed into the gas proportional counter chamber through a single inlet. There could be an optional sampling stage before proportional counter where the hydrogen gas are sampled over long time (e.g., 24 hours) and feed into the chamber after different separation stages.

Step 2: Apply parameters (temperature or pressure) to hydrogenate Pd coating or other hydrogen absorbing/adsorbing materials in thin film format and/or in nanoparticle format.

Step 3: Evacuate and purge filling gas, which is also the working gas (a mixture containing an inert gas such as Ar and a quench gas such as methane) into the chamber.

Step 4: Apply parameters (e.g., high temperature) to dehydrogenate Pd coating or other hydrogen absorbing/adsorbing materials to release $H_2/T_2$/HT into the gas proportional counter.

Step 5: Apply HV to start proportional counting mode for tritium detection for total counts of tritium or acquire tritium energy spectrum. The 5.7 keV (average energy of tritium beta) fast electron will ionize the inert gas in the chamber to produce electron-ion pairs. Electrons will drift to the anode and ions will drift to the cathode under the influence of an external electric field. The electric field in the immediate vicinity of the central anode wire will be strong enough to produce impact ionization that leads to multiplication of electron-ion pairs, and thus, an amplified current pulse in the external circuit.

Step 6: Evacuate the chamber.

Step 7: Optionally, repeating the method to perform another measurement on another sample.

The fill gas/working gas can, for example, be 90% argon with 10% methane, or 100% argon or 100% methane, or 55% Ar+45% $CH_2CH_2$.

This MEGA proportional counter is different than existing proportional gas counters due to the deposition of the hydrogen absorbing/adsorbing material onto the inner surface of the gas proportional counter, which will actively absorb/adsorb and release hydrogen back to the counting chamber.

The high voltage applied to the gas proportional counter, however, can result in cracking of the thin metal film, which can reduce the life of the counter. As such, there can be other designs where the hydrogen absorbing/adsorbing material and the cathode of the counter are not the same material; in other words, the hydrogen absorbing/adsorbing metal (where high temperature and high pressure can be applied) is another inner cylinder, and the cathode of the proportional counter (where high V will be applied) uses its own metal cylinder exclusively. The insertion of new structure for hydrogen absorbing/adsorbing materials could be in different geometry and dimensions.

Figure 2:
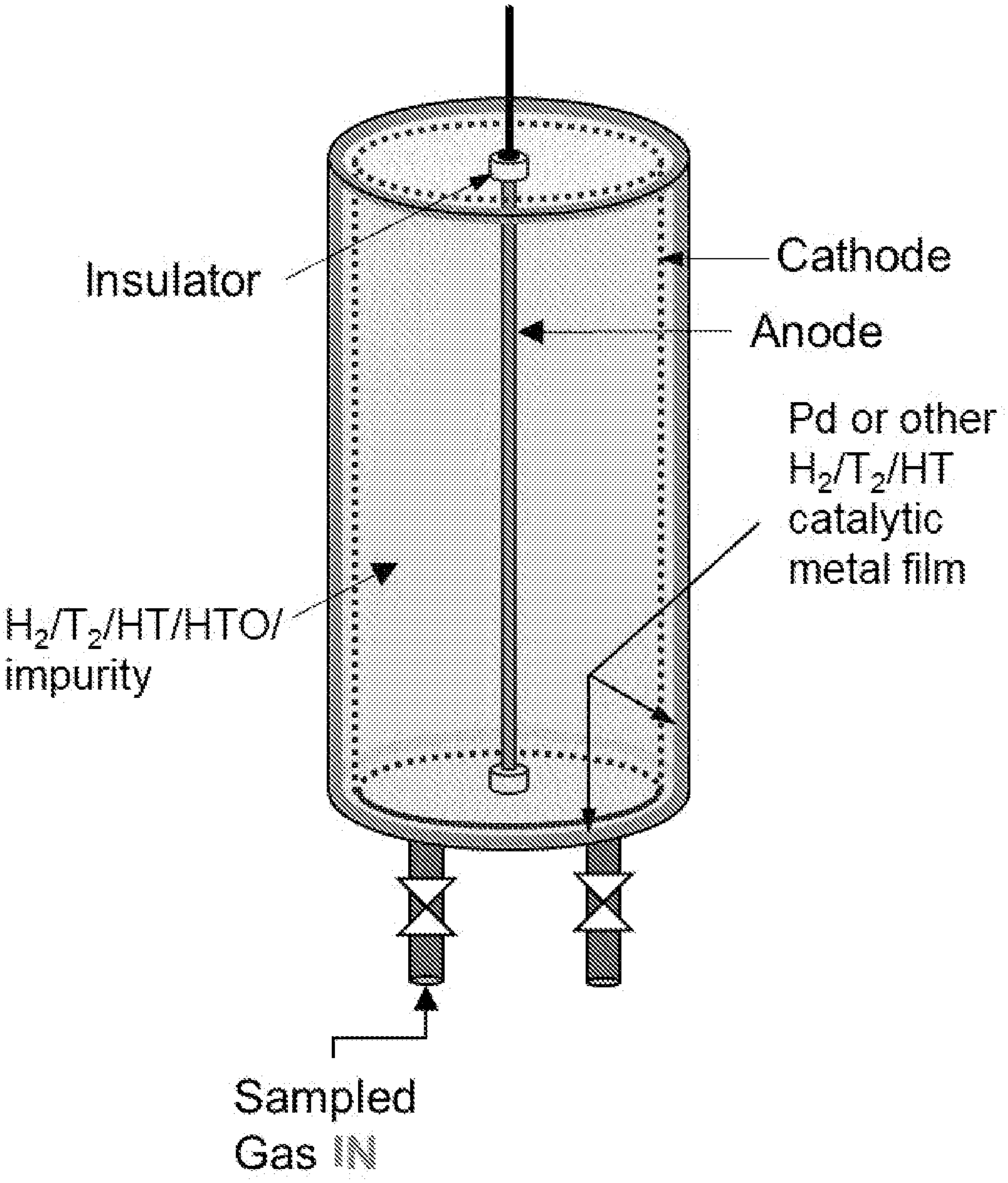
FIG. 2. Schematic diagram of an example device and/or method as disclosed herein according to one implementation.

A schematic diagram of an example system and/or method as disclosed herein according to one implementation is shown in FIG. 2. In this design, the cathode of the gas detector is a metal mesh or screen inside a cylindric wall, on which the hydrogen absorbing/adsorbing metal or materials will be deposited. This design eliminates the dual utilities of the metal wall as both cathode and coating substrate for the hydrogen absorbing/adsorbing materials, thereby reduced the risk of metal cracking.

The metal mesh can have a fill factor large enough to allow Hydrogen/tritium to pass freely both during hydrogenation and dehydrogenation process.

The electric field between metal mesh and center anode can form an E-field to drift electrons to anode for detection.

The MEGA proportional counter for tritium gas detection is:

- Highly selective to tritium gas ($T_2$ or HT);
- Not sensitive to $H_2$ or HTO or $CH_3T$; and
- Free from background or any undesired interference, i.e., there are no other beta emitters, no alpha-emitters, and no X-ray emitters in the gas chamber during counting because hydrogen absorbing/adsorbing materials only absorb/adsorb and release $H_2$, $T_2$, HT from and into the chamber, where only $T_2$ or HT will cause gas ionization to produce detectable signal.

The MEGA proportional counter for tritium gas detection has no flowing gas through the chamber, which can increase sensitivity. The flowing gas proportional counter (GPC) for tritium detection was reported with a detection efficiency of 80-84%, the MEGA proportion counter can achieve 100% detection efficiency.

Described herein below are the principles of proportional counters.

Gas ionization: The interactions of charged particles with a gas lead to ionized and excited molecules. W-value is the average energy required to produce an ion pair with a unit of eV/ion pair. The total number of electron-ion pairs created along the track of the radiation follows a Poisson distribution. But the experimentally observed variance is always smaller. A Fano factor can be introduced, and it is always smaller than 1.

$$\textit{Fano}\ \text{factor} = \text{observed variance}/\text{predicted variance}$$

$$\text{Predicted variance} = \text{incident particle energy}/W\text{-value}$$

The ionization potential and W-values for different gases are summarized in Table 1. W-value is ~25-35 eV/ion pair for the gases. Due to the competing mechanism of the energy loss, i.e. ionization vs. excitation, the average energy lost by the incident particle per ion pair formed (W-value) is always greater than the ionization energy. 1 MeV particle fully stopped in gas will produce about 30,000 Ion Pairs (0.005 pA).

TABLE 1

Ionization potential and W-values for different gases.

| Gas | First ionization potential (eV) | W-value (eV/ion pair) Fast electrons | W-value (eV/ion pair) Alpha particles |
|---|---|---|---|
| Ar | 15.7 | 26.4 | 26.3 |
| He | 24.7 | 41.3 | 42.7 |
| $H_2$ | 15.6 | 36.5 | 36.4 |
| $N_2$ | 15.5 | 34.8 | 36.4 |
| Air | | 33.8 | 35.1 |
| $O_2$ | 12.5 | 30.8 | 32.2 |
| $CH_4$ | 14.5 | 27.3 | 29.1 |

Figure 3:
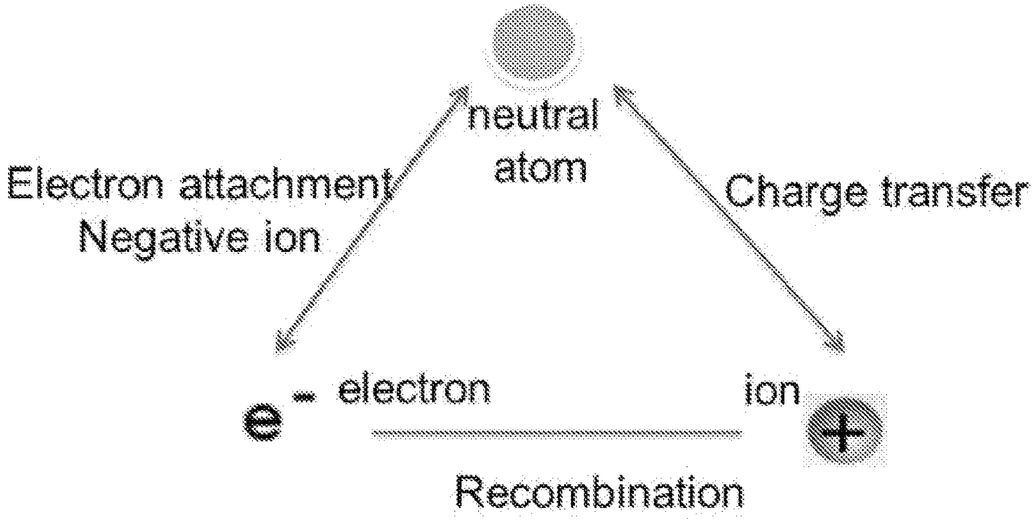
FIG. 3. Schematic illustration of types of collisions in gas.

The neutral atoms or molecules of the gas are in constant thermal motion. The types of collisions in gas are illustrated in FIG. 3. External voltage is needed to create the electric field, pulling apart electrons and ions, to cause them to drift towards anode/cathode. The higher the voltage, the lower the probability of recombination occurring.

Figure 4:
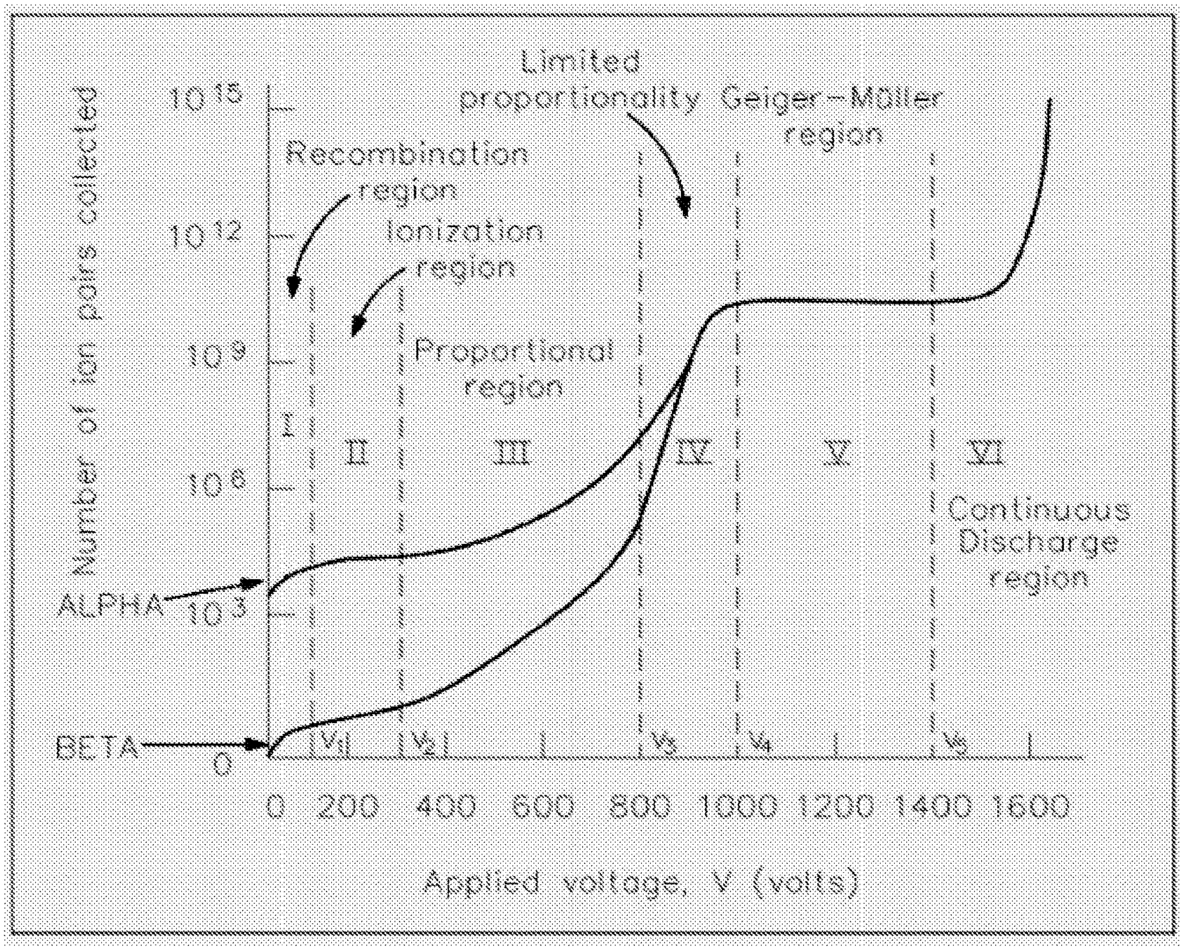
FIG. 4. Number of ion pairs collected versus voltage applied for the working region of gas-filled detectors.

FIG. 4 shows the number of ion pairs collected versus voltage applied for the working region of gas-filled detectors. Recombination region (I): Ions tend to recombine to form neutral atoms or molecules when they move slowly towards the electrons. In this case, the pulse height is less than it would have been if all the ions originally formed reached the electrodes. Gas ionization instruments are, therefore, not operated in this region of response. Ionization region (II): The field strength is more than adequate to ensure collection of all ions produced; however, it is insufficient to cause any increase in number of ion pairs due to zero gas amplification. Proportional region (III): In this region of applied voltage, the counter is above the threshold for gas multiplication. The multiplication is linear; the collected charge is proportional to the number of ion pairs created by the incident radiation. The pulse is dependent on the radiation type, but, importantly, it is dependent on the incident radiation energy. Therefore, (at fixed applied voltage) the measured pulse amplitude (or height) $\propto$ incident particle energy. Limited proportional region (IV): The increase in the applied voltage results in non-linear effects. During the collection of the electrons an (almost) motionless cloud of positive ions is created which is slow to disperse. If the positive ion concentration is high, the electric field is distorted, which leads to distortion in gas multiplication, and non-linearity is observed. The Geiger Müller region (V): The applied voltage is made sufficiently high so that the UV photons and the second electrons could create self-propagation chain avalanche. The avalanche proceeds until so many positive ions are created that they reduce the electric field below the point at which the gas multiplication can take place. The pulse terminates when the same total numbers of positive ions are created, regardless of the number of initial ions created by the incident radiation. Each pulse is of the same amplitude. Thus, the pulse amplitude does not reflect the energy absorbed by the detector by each interaction. Geiger Müller pulses contain no energy information, no particle information. Continuous Discharge Region (VI): a steady discharge current flows. The applied voltage is so high that, once ionization takes place in the gas, there is a continuous discharge of electricity, so that the detector cannot be used for radiation detection.

Cylinder wall design in gas-filled detector: The basic cylindrical geometry with a central anode wire and the outer walls acting as the cathode is a common design for proportional and Geiger-Müller counters. There are at least two reasons for using a cylindrical wall: 1) Achieving high gas multiplication with small applied voltage. In a (parallel) plate geometry, if the gap between the plates is 1.0 cm, then to create an applied field of $5.18\times10^6$ V/m, it is necessary to apply 51,800 V. Such a high voltage is practically impossible. Meanwhile, for a cylindrical proportional counter with an anode wire radius of 80 μm and a cathode inner radius of 1 cm, then to create an applied field of $5.18\times10^6$ V/m at the anode wire surface, V should be 2000 V. 2) Keeping uniform gas multiplication in most of the detector region.

In a cylindrical geometry with the anode at the center, the electric field at the radius r from the anode is given by:

$$E(r) = \frac{\text{V}}{r\ln(b/a)}$$

where V is the voltage applied between anode and cathode, a is the anode wire radius, and b is the cathode inner radius.

In a cylindrical counter, uniform multiplication is only achieved if the region of gas multiplication is confined to a very small volume of the gas compared with the total gas volume. This is achieved because gas multiplication has a threshold in the electric field. Using the previous example, suppose that the threshold is $10^6$ V/m, a=80 μm, b=1 cm, and V=2000 V. With the previous equation, $E>10^6$ V/m where r<410 μm, which is only 0.17% of the counter volume.

Fill gas: Because gas multiplication is critically dependent on the migration of electrons, the selected filling gas should avoid electron attachment, such as a noble gas.

Collisions may occur where the gas molecule is raised to an excited state but not ionized, so secondary electrons are not created. There is no contribution from this molecule to the avalanche; it decays by photon emission. The photons can create ionization elsewhere in the fill gas by interacting with less tightly bound electrons or interacting by the photoelectric effect in the counter wall.

This is not an issue for Geiger-Müller counters where additional avalanche due to secondary photon emission is desired. However, it creates spurious or false pulses and/or loss of proportionality in proportional counter. Thus, a quenching gas is needed.

Cost dictates that argon is commonly used, usually as a mixture of 90% argon with 10% methane. This is called P-10 gas.

Although the excited molecules can at times be used to drive an appropriate signal (as in the gas scintillators), the majority of gas-filled detectors are based on sensing the direct ionization created by the passage of the radiation.

Metal Hydrides: Metal hydrides come in two rough categories. 1) interstitial metal hydrides (AB, $AB_2$, $A_2B$, and ABs Laves Phases), and 2) hydrogen ceramics ($MgH_2$, $YH_3$, $Li(BH_4)$, etc.). Interstitial hydrides have great A and B site solubility of different atoms. A common one is $LaNi_5$+misch metal.

Figure 5:
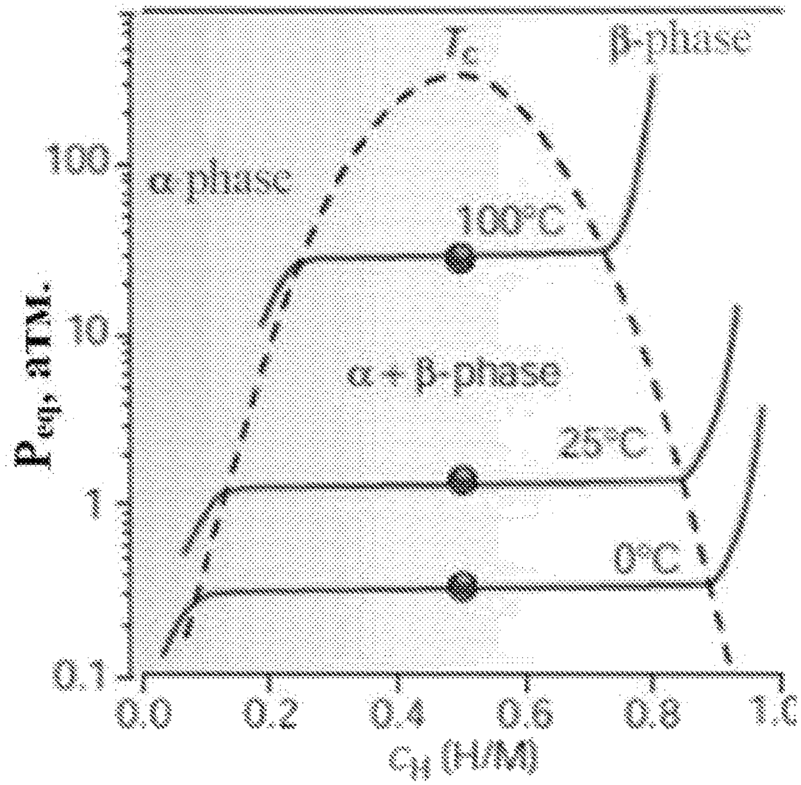
FIG. 5. Metal Hydride thermodynamics.
Figure 6:
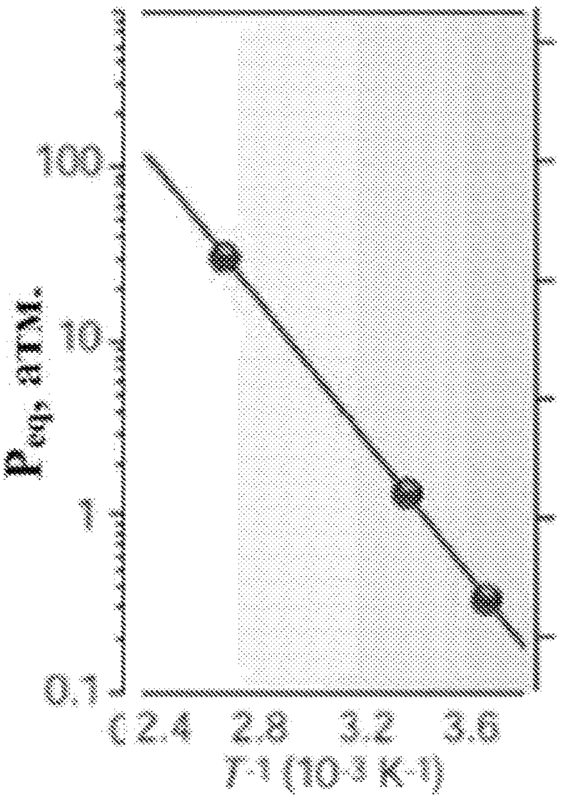
FIG. 6. Van't Hoff Plot.

Metal Hydride Thermodynamics: Metal hydride thermodynamics are shown in FIG. 5. Isotherms are measured as a function of hydrogen partial pressure. The midpoint of the plateau is called the equilibrium pressure. For a flat isotherm above $p_{eq}$ the hydride is fully loaded with hydrogen. $P_{eq}$ is a function of temperature. Heating can increase $p_{eq}$ several orders of magnitude causing hydrogen release. The relationship between the $p_{eq}$ and temperature is captured by a van't hoff plot (FIG. 6). The slope is the enthalpy of the hydride.

Quantity of hydrogen stored: Assuming a 2 inch diameter by 12 inch tall cylinder, the inner surface area is 486 $cm^2$ (0.0486 $m^2$). The volume of hydride coated on the inner surface is thus thickness of the hydride multiplied by 0.486 $m^2$.

$LaNi_5$ stores 115 kg $H_2/m^3$ (1.15e-4 kg $H_2/cm^3$, 115e-1 g $H_2/cm^3$). Hydrogen is 2 g/mole. Thus, $LaNi_5$ stores 5.75E-2 moles $H_2/cm^3$.

The total amount of hydrogen thus stored in a $LaNi_5$ coating would be 5.75E-2 moles $H_2/cm^3$ multiplied by 486 $cm^2$ multiplied by the thickness, which simplifies to 27.945 moles multiplied by the thickness. If a film with a thickness of 10 μm ($10^3$ cm) is used, then the coating can absorb/adsorb 0.027 moles of hydrogen gas.

Example 2

The primary methods for determining the low concentration of tritium are by using a gas proportional counter and a liquid scintillation counter (LSC). The downside of these methods is either the requirement of laborious sample preparation in a lab setting or the sensitivity to other radioactive gases (such as Xe-127, KR-85, and C-14) and pressure.

Described herein are devices, systems, and methods for the detection of tritium gas by incorporating hydrogen absorbing/adsorbing materials into the proportional counter, referred to herein as a metal gas (MEGA) proportional counter.

The hydrogen or hydrogen-containing gas can be firstly sampled into the chamber, where they will be absorbed/adsorbed/dissolved into hydrogen absorbing/adsorbing materials forming metal hydride; the chamber will then be purged with filling gas to remove residual gas and then apply high temperature to release hydrogen gas back into the chamber. The subsequent detection will be in a standard gas proportion counter detection more where only tritium will be detected.

These devices, systems, and methods are highly selective to tritium, inherently free of background signals from other alpha/beta emitting gas in the air (e.g., Radon gas and C-14), and are 100% efficient in detecting tritium gas. They also have an internal gain as high as 10 to increase the signal-to-noise ratio.

These devices, systems, and methods can find applications in the defense and aerospace sectors, medical isotope production and medical research facilities, nuclear non-proliferation, and the tracer tritium has also been found in applications in meteorology, cosmology, geohydrology, biology, agriculture, and medical sciences both in aqueous and organic forms.

These devices, systems, and methods couple metal and gas (MEGA) for tritium gas detection. These devices, systems, and methods relate to a metal hydride activated MEGA proportional counter for tritium gas detection.

Methane is the working gas for proportion counter. 90% argon and 10% of methane has been the best working gas recipe. It's used for quenching purpose. Water is to be avoided because it "traps" electrons produces from ionization. This is only for $H_2/T_2$/HT gas detection. The filling gas/working gas could be, for example, 90% argon with 10% methane, or 100% argon or 100% methane, or 55% Ar+45% $CH_2CH_2$.

Example 3

Effective atmospheric monitoring of tritium is of high value because of its role as a signature of nuclear activity. An in-situ tritium measurement system capable of laboratory-level sensitivity has long been desired but has remained technologically out of reach due to the difficulties in sample collection, isolation, and technical requirements for measurement sensitivity.

Tritium indicates specific nuclear activities. It is currently impossible to measure tritium quantitatively in the field at environmental levels. It is desired to develop tritium sampling and measurement system component and integration research and development into a fieldable system providing daily results that match sensitivity achievable only at fixed-site measurement laboratories.

A goal is to replace fixed-site laboratory sample isolation and measurement infrastructure with a self-contained, fieldable system. This goal necessitates pursuing a leap in both sampling and measurement technology that, when integrated, will yield a fieldable system capable of new sample generation and measurement every twenty-four (24) hours.

The goal can be pursued by researching new ways of: (1) sampling atmospheric tritium in the field, (2) measuring tritium concentration in those field samples (preferably at laboratory sensitivity but in the field), and (3) integrating these new technologies into a self-contained, autonomous, fieldable collection-measurement system capable of relevant performance testing and evaluation.

Sampling: Research and develop component technologies to collect, isolate, and concentrate tritium samples from air sampling. Develop methods for obtaining a single sample at least every twenty-four (24) hours repeatedly over many months to enable field measurements within the same system without human intervention.

Measurement: Research and develop measurement component technologies capable of measuring samples with material compatibility with likely sample phase, chemical properties, size, weight, and power (SWaP) limitations.

Integration: Assess the engineering required for fieldability, maintenance, and long-term performance of the research products developed above. The development of an integrated technology device will need to ensure minimal degradation of integrated performance or between the components of the products above. Engineering integration will take into account selection of mechanical components with intent to maximize performance between maintenance cycles.

The Problem of low-level environmental tritium monitoring: Quantitative field measurements of tritium at very low environmental levels are currently not feasible. Tritium concentrations are most often discussed in terms of units of radioactivity. The SI derived unit of radioactivity is the becquerel (Bq), which has units of reciprocal seconds ($s^{-1}$) representing the activity of material where one nucleus decays per second. (In the US, the non-SI unit curie (Ci) is often used. 1 Bq~2.703e-11 Ci~27 picocuries.) While it is a straightforward calculation to convert radioactivity for a specified sample mass to mass units, the language herein will primarily rely upon Bq for discussion of tritium concentration. Environmental activity levels for tritium are commonly <1 Bq/kg. Typical environmental concentrations of hydrogenated samples are known to be extremely low, <1 Bq/L in water vapor and ~1-2 Bq/kg in biological samples. Atmospheric tritium concentrations of the different chemical forms, HTO (water vapor), HT (molecular gas), and $CH_3T$ (methanes and hydrocarbons) and have been reported in literature, with values typically <15 $mBq/m^3$ [1].

Existing Tritium Detection Methods and Limitations: High-sensitivity tritium measurements are typically performed in a two-step process: (1) collection of a pure sample, and (2) a quantification measurement. There is a strong coupling between the sample collection/preparation step and the technique used to quantify tritium concentration.

Quantification measurements most often rely upon tritium's radioactive decay. The extremely low tritium levels in the environment are typically measured by detecting tritium decay events via low energy electron counting in proportional counters or liquid scintillation cocktail. Other isotopic methods such as mass spectrometry can be used to quantify the presence of tritium.

Existing High-Sensitivity Tritium Sampling Methods and Remaining Needs: While tritium can be monitored in real-time by flowing air through measurement chambers that employ either ionization or proportional counters to measure tritium's beta decay electron, this method is negatively affected by several technical factors, including ambient background contamination of other radioactive gases and sensitivity to pressure changes [2]. Thus, the most sensitive tritium sample collection and concentration approaches typically rely upon the creation of an aqueous sample by oxidizing molecules containing hydrogen isotopes in one or more chemical form of tritium. Atmospheric tritium is typically collected passing whole air through a system to capture HTO, HT, and/or $CH_3T$, depending on the method used.

An early method for in situ tritium sampling (but not measurement) is reported by Ostlund [3] and based on two principles: (1) absorption of water vapor with 100% efficiency using a molecular sieve, and (2) catalytic combustion of hydrogen gas on palladium metal. In this approach, air is first passed through the sieve trap to remove all water species at rates of ~1 L/min or higher. The dried air is then passed through a second step that is referred to as a combustion trap. In the combustion trap, hydrogen species are oxidized by atmospheric oxygen into water ($H_2$, HTO, HDO (HDO is water containing deuterium)) and are absorbed in situ on a sieve carrying palladium metal. This approach yields sieve traps that require subsequent laboratory processes to extract samples for measurement. Aqueous sample volumes extracted from this approach are typically ~10-15 mL [1]. When conducted at ambient temperatures, hydrocarbons are not combusted and trapped by this method. Methods for oxidizing hydrocarbons on palladium require elevated temperatures.

More sophisticated approaches have been explored to increase tritium concentration in water samples. A prominent approach uses a multi-step electrolysis cell apparatus which permits sample volume reduction and increases sensitivity for certain measurement techniques [4]. In this approach, $H_2$ is preferentially discharged from a cathode relative to deuterium or tritium, which allows the tritium to be concentrated in the remaining water sample. This approach requires applied charge but also a cooling bath and other laboratory assemblies. Typically, these enriched tritium samples are measured using liquid scintillation methods [5].

Goals include tritium sample collection and concentration techniques that do not require either, (1) a separate step for sample extraction requiring a sample processing laboratory setup, or (2) a separate laboratory-based measurement apparatus. An ideal system will have the capability to prepare and measure individual, daily samples to distinguish all three tritium chemical forms that meet or exceed the program's sensitivity goal for tritium concentration measurements. Furthermore, ideal systems will have limited requirements for consumables and/or sample waste processing or disposal so that the system can function without resource replenishment or maintenance for many months.

All three identified chemical forms of tritium are of interest. An ideal system will provide sampling capability for separate HT, HTO, and $CH_3T$ measurements. The minimum capability if a system providing measurement results from HT samples.

Existing High-Sensitivity Measurement Methods and Remaining Needs: The measurement of tritium samples can be grouped into two general categories: (1) direct radiation measurement of its decay that can be conducted using several radiation detection technologies, and (2) isotopic measurement techniques.

Presently, tritium is measured at very low concentrations and with high sensitivity using radiometric methods due to tritium's high specific activity of 3.57e14 Bq/g (9650 Ci/g). However, as a pure beta emitter with a low endpoint energy of 18.6 keV and a mean beta energy of ~5.7 keV, the low energy measurement presents a significant technical challenge, especially when pursued outside a laboratory setting.

Depending on the final tritium sample form (HT or HTO) the methods that have demonstrated the most sensitivity are liquid scintillation (LSC) [6] or gas proportional counters [7, 8]. For the low energy beta in tritium decay, LSC has the advantage of the sample being fully immersed so the beta can directly interact with the scintillator to produce the light required to measure the decay.

The use of gas proportional counters is given detailed treatment by Bowman [9]. The proportional counters are made from commercially available tube fittings with a counter volume of about 1 L. The counters are typically housed in a passive steel shielding vault and operated at ~3000 V with rack-mounted pulse shape analyzer electronics. In addition to passive shielding, plastic scintillators are used for active cosmic ray vetoes. Count times are ~1000 minutes. This method has demonstrated an impressive overall sensitivity for tritium in water samples of 0.02 pCi/g.

Other methods employing beta counting can be found in the literature, such as silicon avalanche photodiodes [10], plastic scintillators [11]. Additionally, silicon charge couple devices (CCDs) potentially offer unique advantages in the pursuit of low energy beta measurements. As the tritium beta decay measurement offers a number of technical challenges, a leap in existing technology is needed to meet the goal of measuring tritium at environmental levels in the field.

When considering non-radiometric approaches, two mass spectrometry (MS) methods are commonly reported for measuring tritium. The first uses the accumulation of tritium decay products in a closed vessel, namely 3He, that is measured using MS [12]. The second MS method is accelerator mass spectrometry (AMS) using specially prepared tritium sources [13, 14]. At present these existing high-sensitivity approaches require large fixed-site laboratory equipment, significant shielding, and extensive sample preparation equipment.

Demonstrated tritium measurement sensitivity levels for a few different methods are shown in Table 2.

samples to meet identified metrics. These metrics include likely tritium measurement sensitivity for a specified measurement time, material compatibility with likely sample phase, chemical properties, size, weight, and power limitation. The measurements can use either gaseous or aqueous samples derived from whole air processing.

Integration: The goal is to assess the engineering required for field-ability, maintenance, and long-term performance of the research products developed. The development of an integrated technological device will need to ensure minimal degradation of integrated performance or between the components. Engineering integration will take into account selection of mechanical components with intent to maximize performance between maintenance cycles. Packaging of the integrated system should adopt a philosophy that seeks: robustness for system ship-ability, ease of set-up in the field by minimally trained personnel, ease of performance after system set-up, and ease of long-term maintenance in the field. Additionally, the system should be able to provide accurate, repeatable daily measurements with limited waste products and in such a way that the release of the analyzed sample does not impact future sample measurement results (e.g., contamination).

Sampling—Metrics: The program is targeting whole air sampling to prepare a final liquid or gas tritium sample. These metrics require the minimization of isotopic disturbances as the sample enrichment process is conducted. The basic approach to evaluate sampling is to perform side-by-side testing of an existing "gold standard" methodology that relies upon an existing laboratory-based capability.

For sample collection time, the maximum duration can be 36 hours or less, 24 hours or less, or 12 hours or less. Sample collection time represents the total time of whole air sampled. Whole air flow rates (for instances in L/min) are not specifically stated and are assumed to be incorporated into SWaP. As previously noted, air flow rates will depend on the proposed technology, but expected rates range from 1 to 10 L/min.

TABLE 2

Summary of tritium measurement capabilities.

| Measurement Method | Demonstrated Sensitivity | Technical Limitations Relevant to Goals |
|---|---|---|
| Proportional Counters | 0.02 pCi/g (water) [9] | Sample preparation and transfer, required shielding, fragility of measurement equipment |
| Liquid Scintillator | 12.5 mBq, 2.5e−8 ng [14]<br>0.95 Bq/kg in 10 ml sample<br>50 mBq (1e−16 g) [4] | Sample preparation and transfer, required measurement time |
| Accelerator Mass Spec (AMS) using 3He | 0.5 mBq per ml [14] | Long analysis time, sample preparation, availability of an AMS system with appropriate size, weight, and power (SWaP) |
| AMS (3H/1H) | 1 mBq [14] | Small sample size, but complicated sample preparation, availability of AMS system |

Sampling: The goal is to research and develop component technologies to collect, isolate, and concentrate tritium samples from air sampling (nominal air flow rates will depend on the proposed technology, but expected rates range from 1-10 L/min) that meet identified metrics. These metrics require development of methods for obtaining a single sample at least every 24-hours repeatably over many months to enable field measurements within the same system without human intervention.

Measurement: The goal is to research and develop measurement component technologies capable of measuring The efficiency of tritium extraction can be 50% or more, or 90% or more. Tritium extraction efficiency can be evaluated through an independent bench test and alongside an existing laboratory capability.

Measurement—Metrics: Under certain conditions several technical approaches are capable of measuring tritiated samples. The measurement goal is adopted from the standard beta decay measurement sensitivity readily demonstrated in an existing laboratory. This sensitivity level can then be converted from pCi/SCM to a measure of number of tritium atoms per unit mass of sample per SCM.

For sample measurement time, the maximum duration can be 36 hours or less, 24 hours or less, or 12 hours or less.

The mass sensitivity can be 1e-16 g/SCM or less (±10%), 1e-17 g/SCM or less (±10%), or 5e-18 g/SCM or less (±10%). Mass sensitivity is derived from a ~1 pCi/SCM sensitivity and converted to mass/SCM so that non-radiation measurement approaches can define sensitivity in technology appropriate units.

Integration—Metrics:

The key development is the integration sampling and measurement technologies to permit sample collection, transfer, measurement, and reporting. Technologies capable of demonstrating long duration functionality without human operation are sought. The desired endurance is six months in ambient indoor room temperature environments.

The duration of autonomous operation can be one month or more, 3 months or more, or 6 months or more.

The integrated system tritium sensitivity can be 1e-17 g/SCM or less (±10%), or 5e-18 g/SCM or less (±10%).

The result report periodicity can be 24 hour or less, or 12 hours or less. Result report periodicity assumes a 24-hour result after the production of the first sample within a previous 24-hour period.

REFERENCES

[1] N. Akata et al. "Tritium concentrations in the atmospheric environment at Rokkasho, Japan before the final testing of the spent nuclear fuel reprocessing plant," *Journal of Environmental Radioactivity*, vol. 102, no. 9, pp. 837-842, 2011.

[2] T. Aoyama et al. "Application of air proportional counters to a tritium-in-air monitor," Nuclear Instruments and Methods in Physics Research Section A, vol. 254, no. 3, pp. 620-626, 1987.

[3] H. Ostlund, "A Sampling System for Atmospheric HT and HTO," IEEE Transactions on Nuclear Science, vol. 21, no. 1, pp. 510-512, 1974.

[4] W. Plastino et al. "Tritium in water electrolytic enrichment and liquid scintillation counting," Radiation Measurements, vol. 42, pp. 68-73, 2007.

[5] E. Furuta et al. "Measurement of tritium with high efficiency by using liquid scintillation counter with plastic scintillator," Applied Radiation and Isotopes, vol. 93, pp. 13-17, 2014.

[6] K. Hofstetter et al. "Field deployable tritium analysis system for ground and surface water measurements," Journal of Radioanalytical and Nuclear Chemistry, vol. 233, no. 1-2, pp. 201-205, 1998.

[7] P. Theodorsson, "A review of low-level tritium systems and sensitivity requirements," Applied Radiation and Isotopes, vol. 50, pp. 311-316, 1999.

[8] D. Stanga and P. Cassette, "Improved method of measurement for tritiated water standardization by internal gas proportional counting," Applied Radiation and Isotopes, vol. 64, pp. 160-162, 2006.

[9] W. W. Bowman and M. B. Hughes, "Proportional counting techniques for routine tritium analyses at environmental levels," in IAEA international symposium on methods of low-level counting and spectrometry, Berlin, F.R. Germany, 1981.

[10] K. S. Shah et al. "High Efficiency Detection of Tritium Using Silicon Avalanche Photodiodes," IEEE Transactions on Nuclear Science, vol. 44, no. 3, pp. 774-776, 1997.

[11] T. Uda et al. "Detection efficiency of plastic scintillator for gaseous tritium sampling and measurement system," Fusion Engineering and Design, vol. 85, pp. 1474-1478, 2010.

[12] P. Jean-Baptiste et al. "3He mass spectrometry for very low-level measurement of organic tritium in environmental samples," Journal of Environmental Radioactivity, vol. 101, no. 2, pp. 185-190, 2010.

[13] A. H. Love et al. "Improving tritium exposure reconstructions using accelerator mass spectrometry," Analytical and Bioanalytical Chemistry, vol. 379, pp. 198-203, 2004.

[14] X. Hou and P. Roos, "Critical comparison of radiometric and mass spectrometric methods for the determination of radionuclides in environmental, biological and nuclear waste samples," Analytica Chimica Acta, vol. 608, pp. 105-139, 2008.

[15] SENSEI Collaboration, "SENSEI: Direct-Detection Results on sub-GeV Dark Matter from a New Skipper CCD," Physical Review Letters, vol. 125, no. 17, p. 171802, 2020.

EXEMPLARY ASPECTS

In view of the described devices, systems, and methods for tritium gas detection, herein below are described certain more particularly described aspects of the inventions. The particularly recited aspects should not, however, be interpreted to have any limiting effect on any different claims containing different or more general teachings described herein or that the "particular" aspects are somehow limited in some way other than the inherent meanings of the language and formulas literally used therein.

Example 1: A proportional counter-gas ionization device for tritium gas detection, the device comprising: a fluid cell comprising a wall defining a chamber, wherein the chamber extending from a first end to a second end, the first end and the second end being opposite and axially spaced apart; the fluid cell further comprising an inlet and an outlet; the inlet comprising a first valve; the outlet comprising a second valve; when the first valve is open, the inlet is in fluid communication with the chamber and the inlet is configured to provide a path for fluid flow into the chamber; when the second valve is open, the outlet is in fluid communication with the chamber and the outlet is configured to provide a path for fluid flow out of the chamber; when the first valve and the second valve are both closed, the fluid cell is fluid tight; the device further comprising: a cathode, an anode; and a hydrogen sorption layer, the hydrogen sorption layer being a hydrogen absorption layer, a hydrogen adsorption layer, or a combination thereof; the hydrogen sorption layer comprising a metal that forms a metal hydride when hydrogen is absorbed and/or adsorbed; the hydrogen sorption layer coating the wall within the chamber; wherein, when the hydrogen sorption layer is heated after absorbing and/or adsorbing hydrogen, the metal hydride is configured to release the absorbed and/or adsorbed hydrogen into the chamber; a first portion of the anode being within the chamber and coaxial with the chamber; a second portion of the anode extending through the wall outside the chamber; wherein: the wall is the cathode; or the cathode is a conduit disposed within the chamber and coaxial with the chamber, the conduit comprising a mesh wall defining a lumen, the conduit extending from a proximal end to a distal end, the proximal end and the distal end being opposite and axially spaced apart; the cathode being disposed peripherally around and coaxial with the anode; wherein, when the cathode and the anode are conductively coupled to a voltage source, the voltage source is configured to apply a voltage to the cathode and the anode to thereby operate the device as a proportional counter-gas ionization device for tritium gas detection.

Example 2: The device of any examples herein, particularly example 1, wherein the hydrogen sorption layer comprises a metal selected from the group consisting of Ni, Ti, Pt, Pd, Mg, Li, Na, Al, Zn, Mn, Fe, La, Sn, Cu, Co, Ru, Ir, Se, Ca, Zr, Sc, stainless steel, or a combination thereof.

Example 3: The device of any examples herein, particularly example 1 or example 2, wherein the hydrogen sorption layer comprises a metal selected from the group consisting of Pd, Mg, Ni, or a combination thereof.

Example 4: The device of any examples herein, particularly examples 1-3, wherein the hydrogen sorption layer comprises Pd.

Example 5: The device of any examples herein, particularly examples 1-4, wherein the hydrogen sorption layer comprises carbon nanotubes, graphene, hydrogenated amorphous carbon, or a combination thereof.

Example 6: The device of any examples herein, particularly examples 1-5, wherein the hydrogen sorption layer comprises a plurality of particles, the plurality of particles comprising Ni, Ti, Pt, Pd, Mg, Li, Na, Al, Zn, Mn, Fe, La, Sn, Cu, Co, Ru, Ir, Se, Ca, Zr, Sc, stainless steel, carbon nanotubes, graphene, hydrogenated amorphous carbon, or a combination thereof.

Example 7: The device of any examples herein, particularly example 6, wherein the plurality of particles comprise Pd, Mg, Ni, or a combination thereof.

Example 8: The device of any examples herein, particularly example 6 or example 7, wherein the plurality of particles comprise Pd.

Example 9: The device of any examples herein, particularly examples 1-8, wherein the hydrogen sorption layer has an average thickness of from 10 nanometers (nm) to 100 micrometers (microns, μm).

Example 10: The device of any examples herein, particularly examples 1-9, wherein the hydrogen sorption layer has an average thickness of from 10 nanometers (nm) to 10 micrometers (microns, μm).

Example 11: The device of any examples herein, particularly examples 1-10, wherein the fluid cell has a cylindrical shape.

Example 12: The device of any examples herein, particularly examples 1-11, wherein the cathode is the conduit.

Example 13: The device of any examples herein, particularly example 12, wherein the conduit has a cylindrical shape.

Example 14: The device of any examples herein, particularly examples 1-13, wherein the device further comprises an insulator disposed around the anode at the wall, the insulator configured to insulate the anode from the cathode.

Example 15: The device of any examples herein, particularly examples 1-14, wherein the device further comprises a component configured to increase turbulence of fluid flow and/or residence time of a fluid sample within the chamber.

Example 16: The device of any examples herein, particularly example 15, wherein the component comprises a baffle, a fan, a blower, or a combination thereof.

Example 17: The device of any examples herein, particularly examples 1-16, wherein the device is only sensitive to ionization from tritium beta decay.

Example 18: The device of any examples herein, particularly examples 1-17, further comprising a heater configured to heat the wall to thereby heat the layer after absorbing and/or adsorbing hydrogen.

Example 19: A system comprising the device of any examples herein, particularly examples 1-18.

Example 20: The system of any examples herein, particularly example 19, wherein the system further comprises a pump configured to inject a fluid into the chamber via the inlet with an open first valve and/or withdraw a fluid from the chamber via the outlet with an open second valve.

Example 21: The system of any examples herein, particularly example 19 or example 20, wherein the system further comprises an electrolyzer in fluid communication with the inlet of the device, the inlet being configured to receive electrolyzed products from the electrolyzer.

Example 22: A method for detecting tritium gas using the device of any examples herein, particularly examples 1-18 or the system of any examples herein, particularly examples 19-21.

Example 23: The method of any examples herein, particularly example 22, wherein the method comprises: applying a voltage to the cathode and the anode to operate the device as a proportional counter-gas ionization device for tritium gas detection; wherein the chamber is filled with a detection sample, the detection sample comprising a purge fluid and hydrogen desorbed from the metal hydride; the metal hydride having been formed by the hydrogen sorption layer absorbing and/or adsorbing hydrogen from a fluid sample, the fluid sample comprising hydrogen and the fluid sample having been purged from the chamber before the voltage is applied.

Example 24: The method of any examples herein, particularly example 23, wherein the method comprises: at least partially filling the chamber with the fluid sample, such that the fluid sample contacts the hydrogen sorption layer and the hydrogen sorption layer absorbs and/or adsorbs hydrogen from the fluid sample, thereby forming the metal hydride; subsequently purging the chamber by at least partially filling the chamber with a purge fluid thereby pushing the fluid sample out of the chamber; subsequently heating the hydrogen sorption layer to release the absorbed and/or adsorbed hydrogen from the metal hydride into the chamber, thereby forming the detection sample within the chamber; and subsequently applying the voltage to the cathode and the anode to thereby operate the device as a proportional counter-gas ionization device for tritium gas detection.

Example 25: The method of any examples herein, particularly example 24, wherein at least partially filling the chamber with the fluid sample comprises flowing the fluid sample into the chamber through the inlet, wherein the first valve is open and the second valve is closed, such that the fluid sample accumulates within and at least partially fills the chamber.

Example 26: The method of any examples herein, particularly example 25, further comprising closing the first valve after the chamber is at least partially filled with the fluid sample.

Example 27: The method of any examples herein, particularly examples 24-26, wherein purging the chamber comprises flowing the purge fluid into the chamber through the inlet such that the fluid sample flows out of the chamber through the outlet.

Example 28: The method of any examples herein, particularly example 27, further comprising opening the first valve and the second valve, and flowing the purge fluid into the chamber through the inlet such that the fluid sample flows out of the chamber through the outlet.

Example 29: The method of any examples herein, particularly example 28, further comprising closing the first valve and the second valve after the fluid sample flows out of the chamber, such that the chamber is at least partially filled with the purge fluid.

Example 30: The method of any examples herein, particularly examples 22-29, further comprising collecting a signal from the device.

Example 31: The method of any examples herein, particularly example 30, further comprising processing the signal to determine the presence of tritium gas, the concentration of tritium gas, the activity of tritium gas, or a combination thereof.

Example 32: The method of any examples herein, particularly examples 30-31, further comprising subsequently evacuating the chamber.

Example 33: The method of any examples herein, particularly example 32, wherein evacuating the chamber comprises opening the second valve and flowing the detection sample out of the chamber through the outlet.

Example 34: The method of any examples herein, particularly example 32 or example 33, further comprising subsequently repeating the method with another fluid sample.

Example 35: The method of any examples herein, particularly examples 22-34, wherein the fluid sample comprises a liquid, a gas, or a combination thereof.

Example 36: The method of any examples herein, particularly examples 22-35, wherein the fluid sample is a gas, such that the fluid sample is a gaseous sample.

Example 37: The method of any examples herein, particularly examples 22-36, wherein the fluid sample comprises HT, $T_2$, $H_2$, HTO, or a combination thereof.

Example 38: The method of any examples herein, particularly examples 22-37, wherein the fluid sample is contacted with the hydrogen sorption layer for an amount of time of from 1 minute to 36 hours.

Example 39: The method of any examples herein, particularly examples 22-38, wherein the purge fluid comprises a liquid, a gas, or a combination thereof.

Example 40: The method of any examples herein, particularly examples 22-39, wherein the purge fluid is a gas, such that the purge fluid comprises a purge gas.

Example 41: The method of any examples herein, particularly examples 22-40, wherein the purge fluid comprises a fill gas and a working gas.

Example 42: The method of any examples herein, particularly example 41, wherein the fill gas comprises an inert gas, such as argon.

Example 43: The method of any examples herein, particularly example 41 or example 42, wherein the working gas comprises $CH_4$, $CH_2CH_2$, or a combination thereof.

Example 44: The method of any examples herein, particularly examples 22-43, wherein the purge fluid comprises Ar, $CH_4$, $CH_2CH_2$, or a combination thereof.

Example 45: The method of any examples herein, particularly examples 22-44, wherein the purge fluid comprises 90% argon with 10% methane, 100% argon, 100% methane, or 55% Ar with 45% $CH_2CH_2$.

Example 46: The method of any examples herein, particularly examples 22-45, wherein the purge fluid comprises Ar and $CH_4$.

Example 47: The method of any examples herein, particularly examples 22-46, wherein the purge fluid comprises 90% Ar and 10% $CH_4$.

Example 48: The method of any examples herein, particularly examples 22-47, wherein the purge fluid is substantially free of beta emitters, alpha emitters, and X-ray emitters.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The devices, systems, and methods of the appended claims are not limited in scope by the specific devices, systems, and methods described herein, which are intended as illustrations of a few aspects of the claims and any devices, systems, and methods that are functionally equivalent are intended to fall within the scope of the claims. Various modifications of the devices, systems, and methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A proportional counter-gas ionization device for tritium gas detection, the device comprising:

a fluid cell comprising a wall defining a chamber, wherein the chamber extending from a first end to a second end, the first end and the second end being opposite and axially spaced apart;

the fluid cell further comprising an inlet and an outlet;

the inlet comprising a first valve;

the outlet comprising a second valve;

when the first valve is open, the inlet is in fluid communication with the chamber and the inlet is configured to provide a path for fluid flow into the chamber;

when the second valve is open, the outlet is in fluid communication with the chamber and the outlet is configured to provide a path for fluid flow out of the chamber;

when the first valve and the second valve are both closed, the fluid cell is fluid tight;

the device further comprising:

a cathode;

an anode; and a hydrogen sorption layer, the hydrogen sorption layer being a hydrogen absorption layer, a hydrogen adsorption layer, or a combination thereof;

the hydrogen sorption layer comprising a metal that forms a metal hydride when hydrogen is absorbed and/or adsorbed;

the hydrogen sorption layer coating the wall within the chamber;

wherein, when the hydrogen sorption layer is heated after absorbing and/or adsorbing hydrogen, the metal hydride is configured to release the absorbed and/or adsorbed hydrogen into the chamber;

a first portion of the anode being within the chamber and coaxial with the chamber;

a second portion of the anode extending through the wall outside the chamber;

wherein:

the wall is the cathode; or the cathode is a conduit disposed within the chamber and coaxial with the chamber, the conduit comprising a mesh wall defining a lumen, the conduit extending from a proximal end to a distal end, the proximal end and the distal end being opposite and axially spaced apart;

the cathode being disposed peripherally around and coaxial with the anode;

wherein, when the cathode and the anode are conductively coupled to a voltage source, the voltage source is configured to apply a voltage to the cathode and the anode to thereby operate the device as a proportional counter-gas ionization device for tritium gas detection.

2. The device of claim 1, wherein the hydrogen sorption layer comprises a metal selected from the group consisting of Ni, Ti, Pt, Pd, Mg, Li, Na, Al, Zn, Mn, Fe, La, Sn, Cu, Co, Ru, Ir, Se, Ca, Zr, Sc, stainless steel, or a combination thereof.

3. The device of claim 1, wherein the hydrogen sorption layer comprises a metal selected from the group consisting of Pd, Mg, Ni, or a combination thereof.

4. The device of claim 1, wherein the hydrogen sorption layer comprises carbon nanotubes, graphene, hydrogenated amorphous carbon, or a combination thereof.

5. The device of claim 1, wherein the hydrogen sorption layer comprises a plurality of particles, the plurality of particles comprising Ni, Ti, Pt, Pd, Mg, Li, Na, Al, Zn, Mn, Fe, La, Sn, Cu, Co, Ru, Ir, Se, Ca, Zr, Sc, stainless steel, carbon nanotubes, graphene, hydrogenated amorphous carbon, or a combination thereof.

6. The device of claim 5, wherein the plurality of particles comprise Pd, Mg, Ni, or a combination thereof.

7. The device of claim 1, wherein the hydrogen sorption layer has an average thickness of from 10 nanometers (nm) to 100 micrometers (microns, μm).

8. The device of claim 1, wherein the fluid cell has a cylindrical shape.

9. The device of claim 1, wherein the cathode is the conduit.

10. The device of claim 9, wherein the conduit has a cylindrical shape.

11. The device of claim 1, wherein the device further comprises an insulator disposed around the anode at the wall, the insulator configured to insulate the anode from the cathode.

12. The device of claim 1, wherein the device further comprises a component configured to increase turbulence of fluid flow and/or residence time of a fluid sample within the chamber.

13. The device of claim 12, wherein the component comprises a baffle, a fan, a blower, or a combination thereof.

14. The device of claim 1, wherein the device is only sensitive to ionization from tritium beta decay.

15. The device of claim 1, further comprising a heater configured to heat the wall to thereby heat the layer after absorbing and/or adsorbing hydrogen.

16. A system comprising the device of claim 1, wherein the system further comprises a pump configured to inject a fluid into the chamber via the inlet with an open first valve and/or withdraw a fluid from the chamber via the outlet with an open second valve.

17. The system of claim 16, wherein the system further comprises an electrolyzer in fluid communication with the inlet of the device, the inlet being configured to receive eletrolyzed products from the electrolyzer.

18. A method for detecting tritium gas using the device of claim 1.

19. The method of claim 18, wherein the method comprises:

applying a voltage to the cathode and the anode to operate the device as a proportional counter-gas ionization device for tritium gas detection;

wherein the chamber is filled with a detection sample, the detection sample comprising a purge fluid and hydrogen desorbed from the metal hydride;

the metal hydride having been formed by the hydrogen sorption layer absorbing and/or adsorbing hydrogen from a fluid sample, the fluid sample comprising hydrogen and the fluid sample having been purged from the chamber before the voltage is applied.

20. The method of claim 19, wherein the method comprises:

at least partially filling the chamber with the fluid sample, such that the fluid sample contacts the hydrogen sorption layer and the hydrogen sorption layer absorbs and/or adsorbs hydrogen from the fluid sample, thereby forming the metal hydride;

subsequently purging the chamber by at least partially filling the chamber with a purge fluid thereby pushing the fluid sample out of the chamber;

subsequently heating the hydrogen sorption layer to release the absorbed and/or adsorbed hydrogen from the metal hydride into the chamber, thereby forming the detection sample within the chamber; and subsequently applying the voltage to the cathode and the anode to thereby operate the device as a proportional counter-gas ionization device for tritium gas detection.

* * * * *